(12) United States Patent
Maruyama et al.

(10) Patent No.: US 10,404,875 B2
(45) Date of Patent: Sep. 3, 2019

(54) ROLLER, SEPARATION DEVICE, IMAGE READING APPARATUS, AND RECORDING APPARATUS

(71) Applicant: SEIKO EPSON CORPORATION, Tokyo (JP)

(72) Inventors: Hidenobu Maruyama, Azumino (JP); Kenta Anegawa, Matsumoto (JP); Hidehito Okuhara, Shiojiri (JP); Naohiro Daito, Shiojiri (JP); Takashi Kawabata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/951,517

(22) Filed: Apr. 12, 2018

(65) Prior Publication Data

US 2018/0302523 A1    Oct. 18, 2018

(30) Foreign Application Priority Data

Apr. 13, 2017 (JP) ................. 2017-079505
Apr. 13, 2017 (JP) ................. 2017-079506

(51) Int. Cl.
*B65H 3/06* (2006.01)
*H04N 1/00* (2006.01)
(Continued)

(52) U.S. Cl.
CPC ....... *H04N 1/00602* (2013.01); *B65H 3/0638* (2013.01); *B65H 3/0669* (2013.01);
(Continued)

(58) Field of Classification Search
CPC ........ B65H 2404/11; B65H 2404/1122; B65H 2404/117; B65H 3/0638
See application file for complete search history.

(56) References Cited

U.S. PATENT DOCUMENTS 2,603,267 A * 7/1952 Simpson ................. B60B 9/12
101/376
5,023,040 A * 6/1991 Gajewski ................. B60C 7/12
156/113
(Continued)

FOREIGN PATENT DOCUMENTS

JP    S61-206767 A    9/1986
JP    62-224719 A    10/1997
(Continued)

*Primary Examiner* — Howard J Sanders
(74) *Attorney, Agent, or Firm* — Workman Nydegger

(57) ABSTRACT

A roller includes a shaft, and an elastic body portion that is provided on an outer peripheral surface of the shaft, in which the elastic body portion includes an inner peripheral portion which becomes a shaft side, an outer peripheral portion which becomes an outer side with respect to the inner peripheral portion, a plurality of first connection portions which connect the inner peripheral portion and the outer peripheral portion, and a plurality of second connection portions which are provided in a space portion between the adjacent first connection portions and which partition the space portion into one side and the other side of the roller in the axial direction, and in which the first connection portion is inclined in the same direction in a peripheral direction with respect to a radial direction of the roller.

17 Claims, 16 Drawing Sheets

(51) Int. Cl.
*B65H 27/00* (2006.01)
*B65H 29/20* (2006.01)
*H04N 1/12* (2006.01)
*B65H 3/52* (2006.01)
*B65H 5/06* (2006.01)
*B65H 29/14* (2006.01)

(52) U.S. Cl.
CPC ............ *B65H 3/5284* (2013.01); *B65H 5/06* (2013.01); *B65H 27/00* (2013.01); *B65H 29/14* (2013.01); *B65H 29/20* (2013.01); *H04N 1/121* (2013.01); *B65H 2401/111* (2013.01); *B65H 2402/35* (2013.01); *B65H 2402/80* (2013.01); *B65H 2404/11* (2013.01); *B65H 2404/111* (2013.01); *B65H 2404/117* (2013.01); *B65H 2404/1122* (2013.01); *B65H 2404/147* (2013.01); *B65H 2404/1431* (2013.01); *B65H 2404/18* (2013.01); *B65H 2404/181* (2013.01); *B65H 2801/06* (2013.01); *B65H 2801/15* (2013.01); *B65H 2801/39* (2013.01)

(56) References Cited

U.S. PATENT DOCUMENTS

| | | | |
|---|---|---|---|
| 7,386,249 B2 * | 6/2008 | Bethel | G03G 15/0818 399/105 |
| 8,061,398 B2 | 11/2011 | Palinkas | |
| 2003/0218293 A1 | 11/2003 | Mizuno et al. | |
| 2017/0225916 A1 * | 8/2017 | Tsuda | B65H 3/0607 |

FOREIGN PATENT DOCUMENTS

| | | |
|---|---|---|
| JP | 4090362 B | 12/2003 |
| JP | 2006-001656 A | 1/2006 |
| JP | 2008-241739 A | 10/2008 |
| JP | 4593389 B | 9/2010 |
| JP | 5449272 B | 1/2014 |
| JP | 2016-175710 A | 10/2016 |
| JP | 6094913 B | 8/2017 |
| JP | 6094919 B | 8/2017 |

* cited by examiner

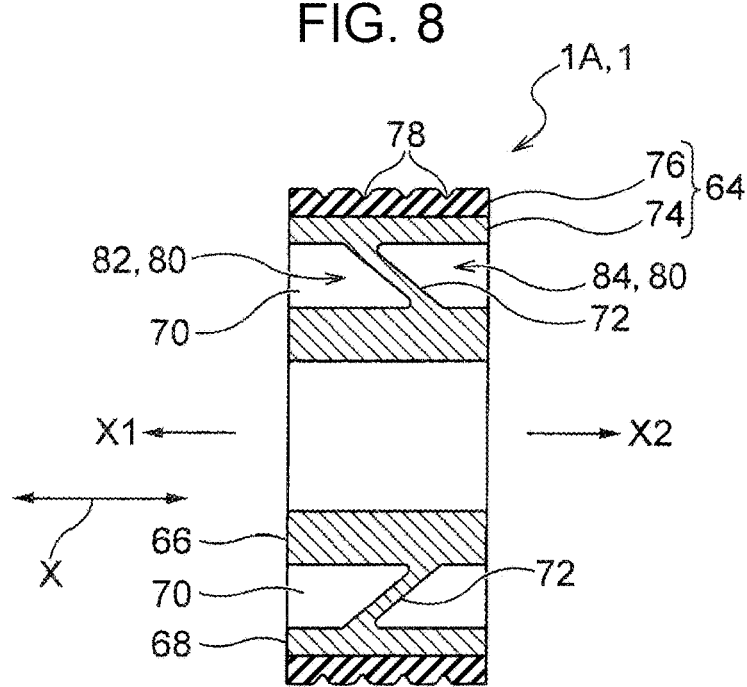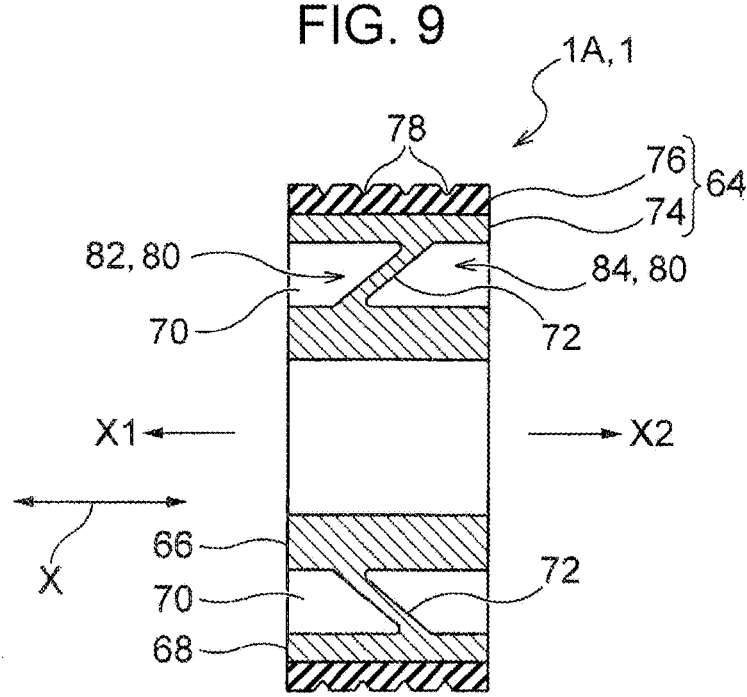

ROLLER, SEPARATION DEVICE, IMAGE READING APPARATUS, AND RECORDING APPARATUS

BACKGROUND

1. Technical Field

The present invention relates to a roller used for transporting, or the like a medium such as a paper, a separation device including the roller, an image reading apparatus such as a scanner, and a recording apparatus.

2. Related Art

In order to secure a transport performance for various media, a surface of a roller is in contact with a surface of the medium and transports the medium, it is desirable that this kind of rollers is elastically slightly crushed a surface thereof which is brought into contact therewith and the contact area between the surface of the medium and the surface of the roller increases. In the related art, the crush is realized using a foamed rubber material as a material for the roller.

In addition to the foamed rubber material, an elastomer is used to realize the crush (JP-A-2008-241739 or the like).

However, in order to secure the transport performance of the roller by the foamed rubber material, a high-quality material is required, resulting in a problem of high cost. In addition, cracks are likely to be generated from the foamed portion as a starting point over time, and when repeated deformation is added, it is difficult for the shape thereof to be returned to the original shape thereof, resulting in a problem that the durability of the roller is lowered.

In a roller using an elastomer other than the foamed rubber material, although there is no problem that cracks are likely to be generated from a foamed portion such as a foamed rubber material as a starting point, since the elastomer generally has a rubber hardness higher than that of a foamed rubber material, in order to secure the transport performance of the roller due to the crush, it is difficult to select a proper material and degrees of freedom of selection is lowered. As a result, there is a problem of high cost.

In addition, there are the following problems from the manufacturing aspect of the roller.

Generally, the roller is manufactured by pouring a raw material into a mold and filling the mold with the raw material, as in insert molding or the like. In the insert molding or the like, although it is necessary to secure fluidity when pouring and filling the mold with the raw material thereof, even in a structure in which the roller penetrates from one side surface to the other side surface in the axial direction thereof, it is difficult to secure the fluidity and the time required for completion of filling is likely to be long. Therefore, heat history at the time of curing the raw material is likely to be changed according to locations, and there is a problem that a shape accuracy of an outer peripheral surface of the roller as the final molded product is likely to be reduced.

SUMMARY

An advantage of some aspects of the invention is to structurally realize crush of a surface at the time of transporting for securing a transport performance of a roller, not by selection of materials. In addition, even in a case where the roller is manufactured by pouring and filling a mold with the raw material as in insert molding or the like, the reduction of a shape accuracy of an outer peripheral surface of the roller as the final molded product can be easily suppressed.

According to an aspect of the invention, there is provided a roller including: a shaft, and an elastic body portion that is provided on an outer peripheral surface of the shaft, in which the elastic body portion includes an inner peripheral portion which becomes a shaft side, an outer peripheral portion which becomes an outer peripheral side with respect to the inner peripheral portion, a plurality of first connection portions which connect the inner peripheral portion and the outer peripheral portion to each other, and a plurality of second connection portions which are provided in a space portion between the adjacent first connection portions to each other and which partitions the space portion into one side and the other side of the roller in a shaft mounting direction, and in which the first connection portion is inclined in the same direction in a circumferential direction with respect to a radial direction of the roller.

Here, in this configuration, the term "inclined" is used as a meaning including a structure in which the first connection portion has a curved shape and is inclined with respect to the radial direction in a side view in addition to the structure in which the first connection portion has a linear shape and is inclined with respect to the radial direction from a center of the roller in a side view of the roller.

In this configuration, since the plurality of first connection portions are inclined in the same direction in the circumferential direction with respect to the radial direction from the center of the roller, when the roller is pressed against the medium such as paper and exerts a transporting action, the roller is easily crushed by the inclined structure of the first connection portion, and thus the contact area can increase. Supplementally, even if the elastic body portion is made of a material having a high rubber hardness, it can be easily crushed by the inclined structure and the contact area can increase.

A mechanism of the crush of the roller in this configuration will be described below.

When the roller is pressed against the medium and a pressing force directed toward the center of the roller is applied to the medium, a force (shearing) in the opposite direction parallel to the pressing direction respectively acts on both the connection portion of the first connection portion with the inner peripheral portion and the connection portion of the first connection portion with the outer peripheral portion. If the first connection portion is a rigid body, although the first connection portion will mainly be "swung" by the force, since the first connection portion is also an elastic body in this configuration, the first connection portion can "shrink in the longitudinal direction" by the force. In other words, the first connection portion of this configuration can "shrink in the longitudinal direction" while "swinging" when a pressing force is applied to the roller. This crush can be realized by this behavior.

Accordingly, it is possible to easily structurally realize the crush of the roller surface at the time of transport for securing the transport performance of the roller not by selection of materials.

In addition, in a case of manufacturing the roller by the insert molding or the like, the fluidity of the raw material is likely to be secured by providing the second connection portion, decrease in the shape accuracy of the outer peripheral surface of the roller as a final molded product can be suppressed.

In the roller, the second connection portion may be inclined with respect to a surface orthogonal to the shaft mounting direction of the roller, and inclination directions of adjacent second connection portions to each other via the first connection portion may be opposite to each other.

Here, "inclination" in this specification is used as a meaning for a structure having a curved shape and being inclined with respect to the surface in longitudinal sectional view in addition to the structure having a linear shape and being inclined with respect to the surface in the longitudinal sectional view of the second connection portion.

In this configuration, since the second connection portion is inclined with respect to a surface orthogonal to the shaft mounting direction of the roller, when the pressing force is applied to the roller, the second connection portion can be "shrunk in the longitudinal direction" while "swinging" as in the first connection portion.

Further, since the inclination directions of the adjacent second connection portions to each other via the first connection portion are opposite to each other, the swinging between the adjacent second connection portions is performed to have a relationship of canceling each other via the first connection portion, so that shrinkage deformation in the longitudinal direction is generated exclusively and crush of the roller can be achieved in a well-balanced manner. In other words, since the inclination directions of the adjacent second connection portions via the first connection portion are opposite to each other, forces in the width direction (axial direction) of the device generated by swinging between the second connection portions is performed to have a relationship of canceling each other and the crush of the roller can be achieved in a well-balanced manner.

In the roller, a recessed portion on one side that can be formed on one side of the roller in the shaft mounting direction and the recessed portion on the other side that can be formed on the other side with the second connection portion as a boundary may be formed so as to be symmetrical with respect to a center surface orthogonal to the shaft mounting direction.

In this configuration, since the recessed portion on the one side that can be formed on one side of the roller in the shaft mounting direction and the recessed portion on the other side that can be formed on the other side with the second connection portion as a boundary are formed so as to be symmetrical with respect to the center surface orthogonal to the shaft mounting direction, and further, this symmetrical structure becomes an opposite structure in the adjacent peripheral directions to each other, the crush of the roller can be realized in a more well-balanced manner when the pressing force is applied to the roller.

In the roller, the constituent material of the elastic body portion may be a non-foamed material.

In this configuration, since the constituent material of the elastic body portion is a non-foamed material, there is no problem that a crack is generated over time from the foamed portion as a starting point.

In the roller, the elastic body portion may include an inner layer portion that becomes the shaft side, and an outer layer portion that becomes a side which is in contact with the medium, and the inner layer portion includes the first connection portion, the second connection portion, the inner peripheral portion, and the outer peripheral portion.

In this configuration, the elastic body portion of the roller can be also applied to a two-layered structure and the effect described above can be obtained.

In addition, in the two-layered structure, when the fluidity of the raw material is lowered at the time of manufacturing by insert molding or the like, although the problem that the shape accuracy of the outer layer portion of the roller as the final molded product is likely to be lowered is likely to be generated, in this configuration, since the fluidity can be improved by the second connection portion, generation of the problem can be suppressed.

In the roller, an inclination angle of the first connection portion may be 30° or more with respect to the radial direction of the roller.

In this configuration, since the inclination angle of the first connection portion is 30° or more with respect to the radial direction of the roller, the crush of the roller can be stably realized.

In the roller, an inclination angle of the second connection portion may be 60° or less with respect to the axial direction of the roller.

In this configuration, since the inclination angle of the second connection portion is 60° or less with respect to the axial direction of the roller, the crush of the roller can be stably realized.

In the roller, the numbers of the recessed portion on the one side that can be formed on one side in the axial direction of the roller and the recessed portion on the other side that can be formed on the other side with the second connection portion as a boundary may be 6 or more respectively.

In this configuration, since the number of the recessed portion on the one side that can be formed on the one side in the axial direction of the roller and the recessed portion on the other side that can be formed on the other side with the second connection portion as a boundary is in the range described above, the crush of the roller can be stably realized.

According to another aspect of the invention, there is provided a separation device including: a feeding roller, and a retard roller that forms a pair with the feeding roller, separates media other than a medium to be transported from a bundle of media, and returns the media to an upstream side, in which the retard roller is the roller described above.

In this configuration, an effective separation device can be realized by the pair of the feeding roller and the retard roller.

In the separation device, an inclination direction of the first connection portion may be formed such that, when the roller receives a pressing force from the medium, a swinging direction with the connection portion with the inner peripheral portion of the first connection portion as a supporting point becomes a direction of returning the medium to the upstream side.

In this configuration, when the retard roller receives a pressing force from the medium, although the first connection portion slightly swings, since the swinging thereof can be used for returning the medium to the upstream, an effective separation device can be realized.

According to still another aspect of the invention, there is provided an image reading apparatus including: a reading portion that reads image information of a medium, and a roller that is provided in a medium transport path which passes through a reading execution region of the reading portion and that applies a feeding force to the medium, in which the roller has a structure in which a contact surface between the roller and the medium is elastically crushed when pressed against the medium, and at least one of the rollers is the roller described above.

In this configuration, the effects described above can be obtained as the image reading apparatus.

According to still another aspect of the invention, there is provided a recording apparatus including: a recording portion, and a roller that is provided in a medium transport path passing through a recording execution region of the recording portion and applies a feeding force to the medium, in which the roller has a structure in which a contact surface thereof is elastically crushed when pressed against the medium, and at least one of the rollers is the roller described above.

In this configuration, the effects described above can be obtained as the recording apparatus.

BRIEF DESCRIPTION OF THE DRAWINGS

The invention will be described with reference to the accompanying drawings, wherein like numbers reference like elements.

FIG. 8 is a cross-sectional view taken along line VIII-VIII in FIG. 7 illustrating the roller according to Embodiment 3 of the invention.

FIG. 9 is a cross-sectional view taken along line IX-IX in FIG. 7 illustrating the roller according to Embodiment 3 of the invention.

DESCRIPTION OF EXEMPLARY EMBODIMENTS

First, as an image reading apparatus of the invention, using an example of the continuous automatic feeding type image scanner according to Embodiment 1 illustrated in FIGS. 1 and 2, an outline of the overall configuration of the image reading apparatus and a configuration of a medium transport path will be explained. Next, as a separation device of the invention, using an example of a separation device according to Embodiment 2 illustrated in FIG. 3 mounted on the image reading apparatus, a configuration of the separation device and an outline of a separation action thereof will be explained.

Next, using an example of a roller according to Embodiment 3 illustrated in FIGS. 4 to 18, which can be applied to a retard roller of the separation device, a configuration of the roller of the invention and molding and an action thereof will be specifically described. Furthermore, by picking a roller having a somewhat different configuration from the roller according to the Embodiment 3 as a roller according to Embodiment 4 of the invention, a structure of the roller and an action thereof will be described focusing on the differences from Embodiment 3.

Finally, a configuration of a roller according to another embodiment of the invention, which is different in configuration from Embodiments 3 and 4 and an embodiment in which the roller of the invention is applied to the recording apparatus will be described.

Embodiment 1

Figure 1:
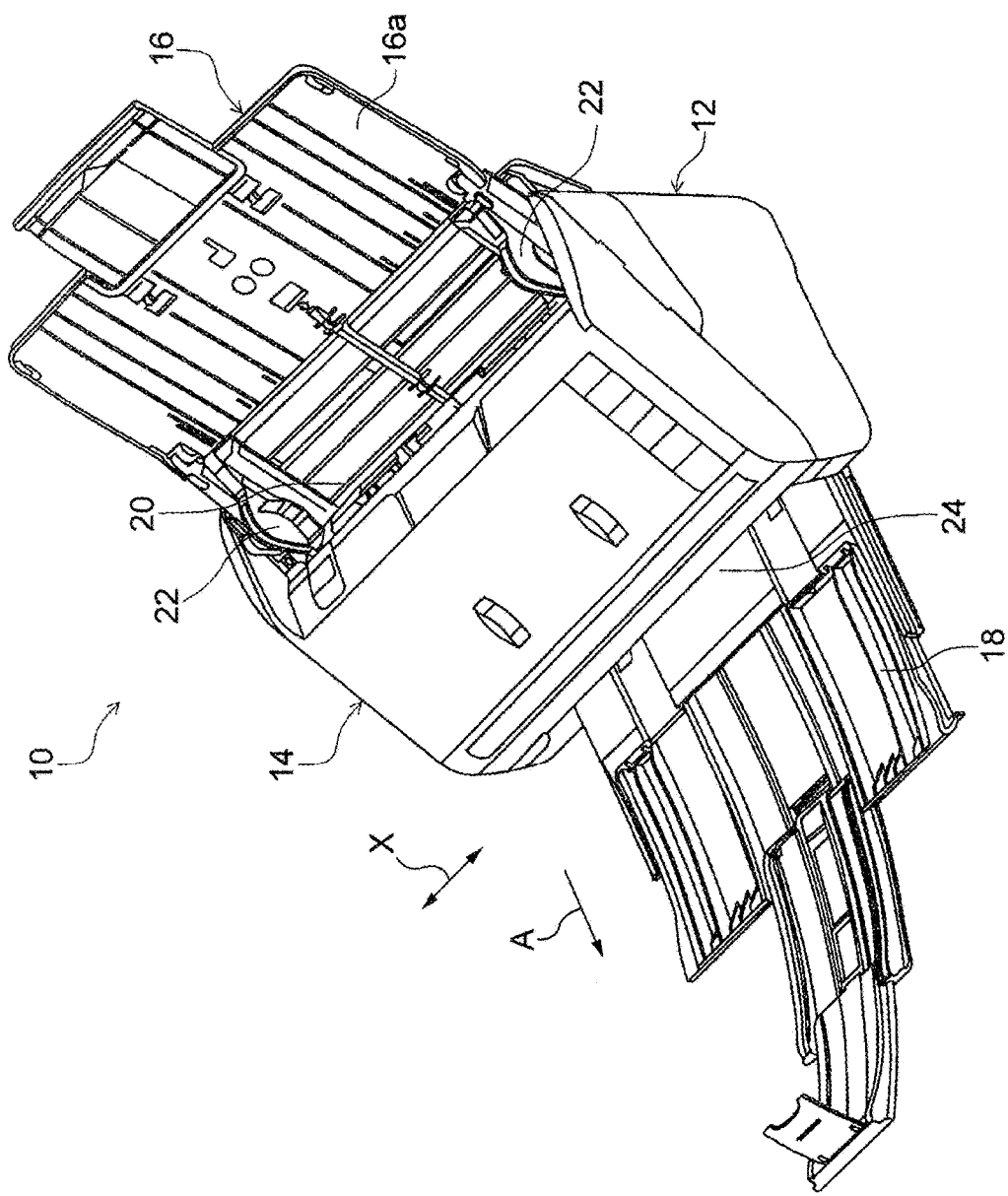
FIG. 1 is a perspective view illustrating an outer appearance of an image reading apparatus according to Embodiment 1 of the invention.
Figure 2:
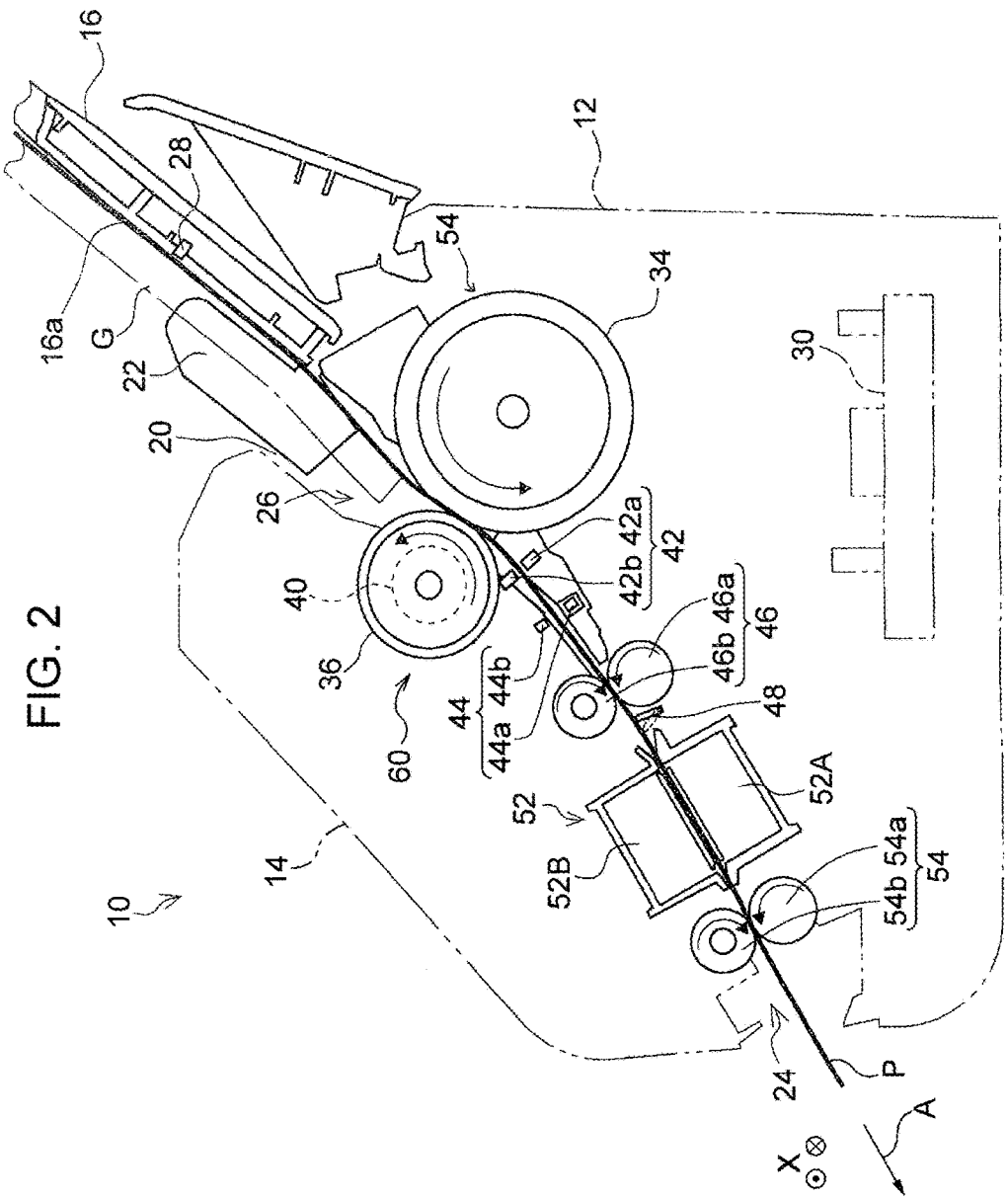
FIG. 2 is a cross-sectional view of a main portion illustrating the image reading apparatus according to Embodiment 1 of the invention.

(1) Outline of Overall Configuration of Image Reading Apparatus (See FIGS. 1 and 2)

The illustrated image reading apparatus 10 includes a lower unit 12, an upper unit 14, a cover portion 16, and a discharge tray 18. In addition, although not illustrated, the upper unit 14 has a rotation supporting point at an end portion on the downstream side in the medium transport direction A of the lower unit 12, and is rotatably attached to the lower unit 12 via the rotation supporting point.

In addition, although not illustrated, on an upper portion of a rear surface side of the lower unit 12, the same rotation supporting point is also provided, and the cover portion 16 is rotatably attached to the lower unit 12 via the rotation supporting point. The cover portion 16 can take a non-feeding state (not illustrated) of covering the upper portion of the upper unit 14 and the feeding port 20 and a feedable state of opening the feeding port 20 by rotating to the rear surface side of the device as illustrated in FIG. 1. Then, when the cover portion 16 is in a feedable state as illustrated in FIG. 1, the back surface of the cover portion 16 is exposed and functions as a medium mounting portion 16a on which the medium P is mounted.

In addition, a discharge port 24 for discharging the medium P is provided on the front surface side of the device of the lower unit 12. In addition, the lower unit 12 includes a discharge tray 18 that can be drawn out from the discharge port 24 toward the front surface side of the device. The discharge tray 18 is attached to the lower unit 12 so as to be capable of taking a state (not illustrated) of being accommodated in a bottom portion of the lower unit 12 and a state (see FIG. 1) of being drawn to the front surface side of the device. In addition, the discharge tray 18 is configured by connecting a plurality of tray members, and the drawing length from the discharge port 24 can be adjusted with respect to the size of the medium P to be discharged.

(2) Configuration of Medium Transport Path in Image Reading Apparatus

Next, a configuration of a medium transport path 26 in the image reading apparatus 10 will be described with reference to FIG. 2. In FIG. 2, only the outer shells of the lower unit 12 and the upper unit 14 are illustrated by virtual lines. In addition, in FIG. 2, the bold solid line denoted by reference symbol P indicates a trajectory of the transport of the medium P transported along the medium transport path 26 in the image reading apparatus 10. The multi-fed medium P which is not illustrated is configured so as to be separated by the separation device 60, which will be described below, and be separated from the medium P transported toward the reading portion 52 and remain at a separation position.

The bundle G of the medium whose a leading end is inserted into the feeding port 20 is set in a state of being supported by the medium mounting portion 16a described above as indicated by a one-dot chain line in FIG. 2. In addition, a placing portion detection sensor 28 is provided on the medium mounting portion 16a. The placing portion detection sensor 28 is configured with a contact type sensor having a lever or the like, an optical non-contact type sensor, or the like, as an example and when the medium P is set on the medium mounting portion 16a, the placing portion detection sensor 28 transmits the detection signal thereof to the control unit 30 indicated by a virtual line in FIG. 2.

In addition, as illustrated in FIG. 1, a pair of edge guides 22 is provided on the medium mounting portion 16a. The edge guides 22 are configured to be movable in mutually approaching directions and in mutually spaced directions in the device width direction X. When the medium P is set on the medium mounting portion 16a, the guide surface of the edge guide 22 is configured so that the guide surface is in contact with the left and right side portions of the medium P in the device width direction X, and the position of the medium P in the device width direction X is restricted, and the feeding of the medium P to the reading portion 52 is guided. The edge guide 22 in FIG. 1 indicates a state where it is most distant in the device width direction X, that is, in the width direction of the medium P.

The medium P located at the lowermost position among the bundle G of the medium set on the medium mounting portion 16a is fed toward the downstream side in the medium transport direction A by a feeding roller 34 driven to rotate by a feeding driving motor (not illustrated). Although not illustrated, two feeding rollers 34 are provided at an interval in the device width direction X as an example. In addition, an outer peripheral surface of the feeding roller 34 is configured to be made of a high friction material (for example, synthetic rubber, elastomer, or the like).

In addition, in FIG. 2, the leading end of the bundle of documents indicated by reference symbol G is held at the feed waiting position illustrated in FIG. 2 by a stopper (not illustrated) before feeding start and entrance thereof between the feeding roller 34 and a retard roller 36 to be described below is restricted.

In addition, a retard roller 36, which is a constituent member of the separation device 60 described below, is provided together with the feeding roller 34 at a position facing the feeding roller 34. As with the feeding roller 34, two retard rollers 36 are also provided in the device width direction X as an example. The retard roller 36 is provided in a state of being urged toward the feeding roller 34 by urging means (not illustrated).

In addition, the retard roller 36 is configured to be driven to rotate in a direction C opposite to the rotation direction B of the feeding roller 34 by a transport driving motor (not illustrated), a torque limiter 40 is provided on the retard roller 36, and via the torque limiter 40, the retard roller 36 is configured to receive a driving torque of a transport driving motor (not illustrated).

A first medium detection sensor 42 for detecting the feeding of the medium P is provided at a downstream position of the feeding roller 34 and the retard roller 36 in the medium transport path 26. Although not illustrated, the first medium detection sensor 42 is disposed as an example within the transport region of the maximum size medium P that can be fed in the device width direction X of the medium transport path 26. The first medium detection sensor 42 is configured as an example by an optically non-contact type sensor including a light emitting unit 42a and a light receiving unit 42b which are disposed at positions facing each other with the medium transport path 26 interposed therebetween. When the medium P is transported to the medium transport path 26, the medium P blocks the detection light from the light emitting unit 42a, so that feeding of the medium P is detected and the detection signal is transmitted to the control unit 30.

On the downstream side of the first medium detection sensor 42 in the medium transport direction A in the medium transport path 26, a multi-feed detection sensor 44 for detecting multi-feeding of the medium P is disposed in the medium transport region in the device width direction X, as an example. The multi-feed detection sensor 44 includes a speaker portion 44a and a microphone portion 44b and is configured to oscillate an ultrasonic wave from the speaker portion 44a toward the medium P passing through the medium transport path 26 and to detect reflected sound from the medium P by the microphone portion 44b. In addition, in the present embodiment, the multi-feed detection sensor 44 is configured to be capable of detecting not only the multi-feeding of the medium P but also the type of the medium P such as the thickness of the medium P, based on the frequency of reflected sound.

At the downstream position of the multi-feed detection sensor 44 in the medium transport direction A in the medium transport path 26, transport roller pair 46 is provided, which is configured with a transport driving roller 46a and a transport driven roller 46b. In addition, a second medium detection sensor 48 configured with a contact type sensor having a lever is provided at a downstream position of the transport roller pair 46 in the medium transport direction A, as an example.

At the downstream position of the second medium detection sensor 48 in the medium transport direction A, there is provided a reading portion 52 that reads the image expressed on the medium P as image information. The reading portion 52 includes a first reading unit 52A provided to the lower unit 12 so as to face a first surface that is a lower surface of the medium P transported along the medium transport path 26, and a second reading unit 52B provided in the upper unit 14 so as to face a second surface that is an upper surface of the medium P to be transported along a medium transport path 26. The first reading unit 52A and the second reading unit 52B are configured as a contact type image sensor module (CISM) as an example.

The medium P from which the image represented on at least one of the first surface and the second surface is read by the reading portion 52 is transported to a discharge roller pair 54 positioned at the downstream position of the reading portion 52 in the medium transport direction A. The discharge roller pair 54 is configured by including a discharge driving roller 54a and a discharge driven roller 54b, and the medium P is nipped by the discharge roller pair 54 configured as described above and discharged from the discharge port 24 to the outside.

The transport driving roller 46a of the transport roller pair 46 and the discharge driving roller 54a of the discharge roller pair 54 may be driven so as to rotate using a single motor as a common drive source, or may be rotationally driven separately using separate motors.

The image reading apparatus 10 according to the embodiment of the invention includes the reading portion 52 described above that reads image information of the medium P, and the various rollers 34, 36, 46, 54, and the like described above that apply a feeding force to a medium P provided in the medium transport path 26 that passes through the reading execution region of the reading portion 52. These rollers 34, 36, 46, 54, and the like have a structure in which the contact surface S is elastically crushed when pressed against the medium P.

At least one of these rollers 34, 36, 46, 54 and the like is configured with the roller 1 of the embodiment according to the invention which will be described below. In the present embodiment, the retard roller 36 is configured by the roller 1 according to the embodiment of the invention.

Embodiment 2

Figure 3:
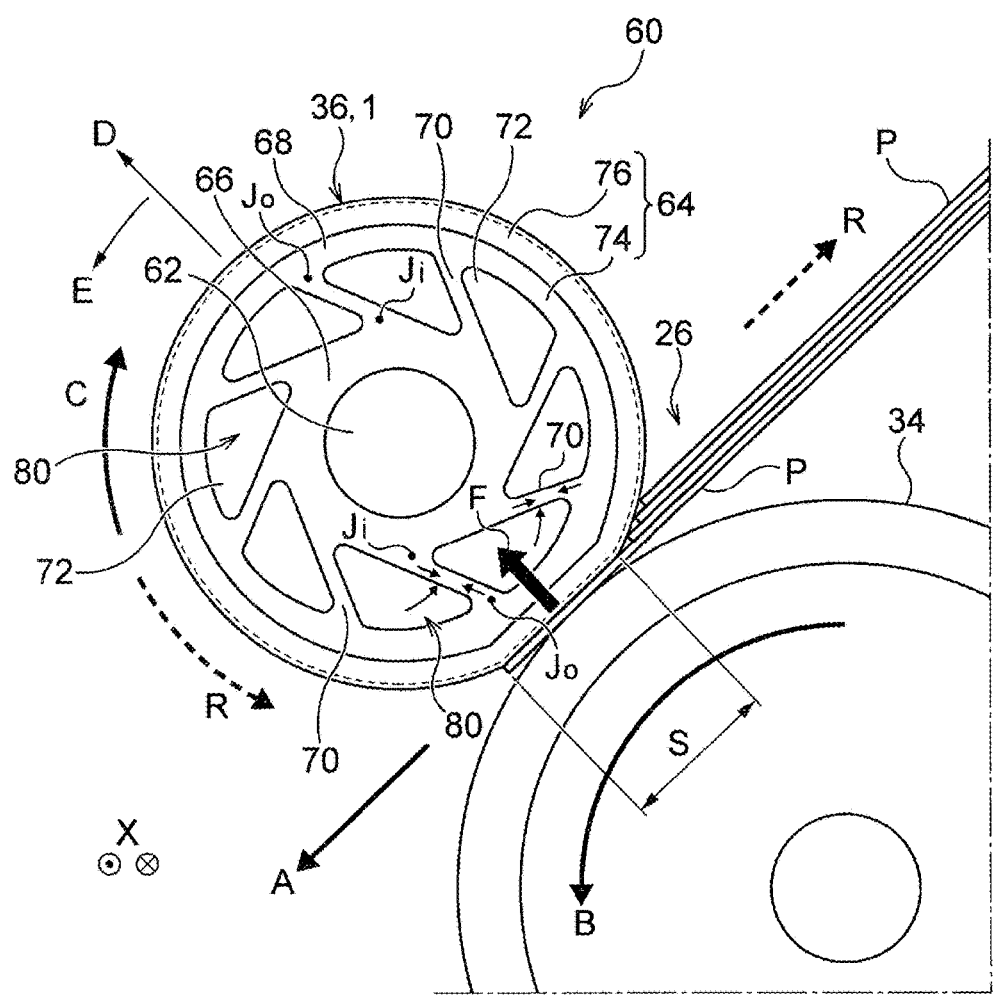
FIG. 3 is a cross-sectional view of a main portion illustrating a separation device according to Embodiment 2 of the invention.

(1) Configuration of Separation Device (See FIG. 3)

The illustrated separation device 60 includes a feeding roller 34, and a retard roller 36 which forms a pair with the feeding roller 34, separates the medium P other than the medium P transported from the bundle G of the medium, and returns the medium P to the upstream, and the retard roller 36 is configured with the roller 1 of the embodiment according to the invention.

The roller 1 of the embodiment according to the invention includes a shaft 62, and an elastic body portion 64 provided on the outer peripheral surface of the shaft 62. The elastic body portion 64 of the roller 1 is configured by including an inner peripheral portion 66 which is a side of the shaft 62, an outer peripheral portion 68 which is the outer peripheral side with respect to the inner peripheral portion 66, a plurality of first connection portions 70 which connect the inner peripheral portion 66 and the outer peripheral portion 68 to each other, and a plurality of second connection portions 72 which are provided in the space portion 80 between the adjacent first connection portions 70 and 70 and partitions the space portion 80 into an X1 side and the other X2 side in the axial direction X of the roller 1 (the same sign as device width direction X is used).

In addition, the first connection portion 70 is provided in a state of being inclined in the same direction in the circumferential direction E with respect to the radial direction D of the roller 1.

As illustrated in FIG. 3, in this embodiment, the inclination direction of the first connection portion 70 is formed such that, when the roller 1 receives the pressing force F from the medium P, the swinging direction with the connection portion Ji as a supporting point when the connection portion of the inner peripheral portion 66 of the first connection portion 70 is referred to as Ji and the connection portion with the outer peripheral portion 68 of the first connection portion 70 is referred to as Jo becomes a direction R of returning the medium P to the upstream side in the medium transport direction A. It is a matter of course that the swinging direction with the connection portion Ji as a supporting point may be attached so as to be opposite to the direction R of returning the medium P to the upstream side in the medium transport direction A.

In addition, in the present embodiment and Embodiment 3 to be described below, the elastic body portion 64 further includes an inner layer portion 74 which is a side of the shaft 62, and an outer layer portion 76 which is the side in contact with the medium P, and configurations including the first connection portion 70, the second connection portion 72, the inner peripheral portion 66, and the outer peripheral portion 68 which are described above are adopted to the inner layer portion 74 among the inner layer portion 74 and the outer layer portion 76.

In the present embodiment, the outer layer portion 76 is configured as an example with a high friction material such as a synthetic rubber, an elastomer, or the like, similarly to the feeding roller 34 described above.

(2) Separation Action of Separation Device (See FIG. 3)

Next, the separation action of the medium P by the separation device 60 described above will be explained separately as (A) a basic separation action and (B) a specific separation action obtained by the roller 1 according to the embodiment of the invention.

(A) Basic Separation Action

When the rotational torque received from the feeding roller 34 described above exceeds the limit torque of the torque limiter 40, the retard roller 36 is disconnected from a driving system of a transport driving motor (not illustrated) that drives the retard roller 36 by the torque limiter 40, follows the feeding roller 34, and rotates in the clockwise direction as indicated by the solid arrow C in FIG. 3.

When the feeding of the medium P is started and a plurality of sheets of medium P enter between the feeding roller 34 and the retard roller 36, the retard roller 36 does not receive the rotational torque from the feeding roller 34, follows the feeding roller 34, and thus rotation thereof is stopped. The retard roller 36 receives the driving force from the transport driving motor via the torque limiter 40 and starts rotation in the opposite direction (counterclockwise direction as indicated by a broken arrow R in FIG. 3) to the feeding roller 34.

Accordingly, the upper medium P to be prevented from the multi-feeding, excluding the lowermost medium P to be fed, cannot receive the transport force for advancing to the downstream side in the medium transport direction A, and is returned to the upstream side in the medium transport direction A due to a rotation of the retard roller 36, and the multi-feeding of the medium P is prevented. Since the lowermost medium P to be fed is in direct contact with the feeding roller 34, the lowermost medium P is transported to the downstream side in the medium transport direction A by a transport force received from the feeding roller 34.

(B) Specific Separation Action

Before the medium P is supplied between the feeding roller 34 and the retard roller 36, the feeding roller 34 and the retard roller 36 are in contact with each other. When a feeding force acts on the lowermost surface medium P of the medium bundle G set on the medium mounting portion 16a by the rotation of the feeding roller 34, a plurality of sheets of medium P enter between the feeding roller 34 and the retard roller 36.

Since the retard roller 36 is not in contact with the feeding roller 34 by the medium P as described above, the driven rotation in the clockwise direction is stopped as indicated by the solid arrow C in FIG. 3, and the reverse rotation is started by own driving force thereof (in a counterclockwise direction as indicated by a broken arrow R in FIG. 3), and returns the two or more media P from the lowermost surface to the upstream in the medium transport direction A.

In the retard roller 36 to which the roller 1 according to the embodiment of the invention is applied, the moment when the medium P enters between the feeding roller 34 and the retard roller 36, the pressing force F acts from the medium P toward the retard roller 36 so that the outer peripheral surface of the retard roller 36 is slightly crushed.

In addition, when the outer peripheral surface of the retard roller 36 is crushed, although the first connection portion 70 slightly swings around the connection portion Ji with the inner peripheral portion 66 as a supporting point, when inclination direction thereof is a direction illustrated in FIG. 3, a slight rotation in the counterclockwise direction in FIG. 3 occurs instantaneously due to the swing. The momentary rotation contributes to the action of returning the medium P to the upstream side in the medium transport direction A.

Therefore, an effective action of separating the medium P can be realized by the retard roller 36 according to the present embodiment to which the roller 1 according to the embodiment of the invention is applied.

Embodiment 3

(1) Configuration of Roller (See FIGS. 4 to 18)

As described above, the roller 1A according to the present embodiment includes the shaft 62, and the elastic body portion 64, and the elastic body portion 64 is configured to include the inner peripheral portion 66, the outer peripheral portion 68, the first connection portion 70, and the second connection portion 72 and the first connection portion 70 is inclined in the same direction in the circumferential direction E with respect to the radial direction D of the roller 1A.

Specifically, the shaft 62 is bridged over an appropriate support member (for example, upper unit 14) so as to extend horizontally in the axial direction X. As described above, the elastic body portion 64 has a two-layered structure including the inner layer portion 74 and the outer layer portion 76, and the inner peripheral portion 66, the outer peripheral portion 68, the first connection portion 70, and the second connection portion 72 which are described above are provided in the inner layer portion 74 among the inner layer portion 74 and the outer layer portion 76.

The outer layer portion 76 is a cylindrical member having a predetermined thickness in the radial direction D and having a predetermined length in the axial direction X, and on the outer peripheral surface in contact with the medium P, a plurality of annular groove portions 78 are formed in the axial direction X at a predetermined pitch. In addition, the inner peripheral surface of the outer layer portion 76 is a junction surface with the inner layer portion 74 and is formed by a smooth uniform cylindrical curved surface in the embodiment illustrated in FIGS. 4 to 9 and FIGS. 12A to 15B.

The inner layer portion 74 includes an inner peripheral portion 66 which is fitted over the shaft 62 and has a predetermined thickness in the radial direction D and a small diameter having a predetermined length in the axial direction X. The inner peripheral surface of the inner peripheral portion 66 serves as a fitting surface to be fitted over the shaft 62.

In addition, the inner layer portion 74 includes the outer peripheral portion 68 which is joined to the inner peripheral surface of the outer layer portion 76, has a predetermined thickness in the radial direction D, and is slightly smaller than the outer layer portion 76 having a predetermined length in the axial direction X. The outer peripheral surface of the outer peripheral portion 68 is a junction surface to be joined to the inner peripheral surface of the outer layer portion 76.

The first connection portion 70 is a member for connecting the inner peripheral portion 66 and the outer peripheral portion 68 together with the second connection portion 72 described below, and in the embodiment illustrated in FIGS. 4 to 9, 8 rectangular plate-shaped members having the same length as that of the inner peripheral portion 66 and the outer peripheral portion 68 and having uniform thickness are arranged at equal intervals in the circumferential direction E in a state of being obliquely inclined as illustrated in the drawings.

Figure 4:
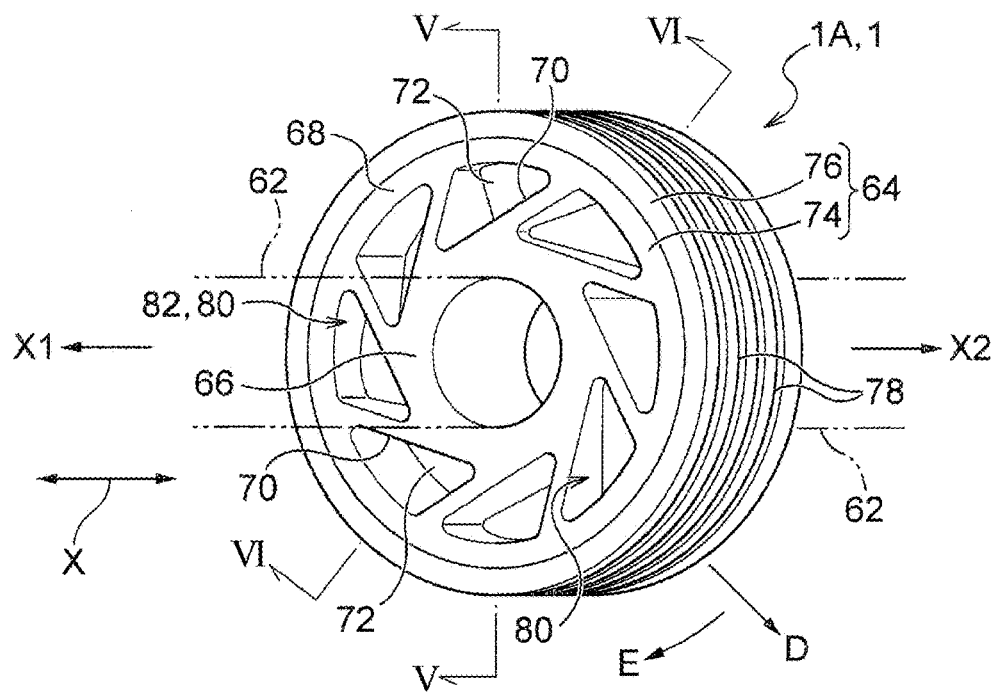
FIG. 4 is a perspective view illustrating a roller according to Embodiment 3 of the invention.
Figure 5:
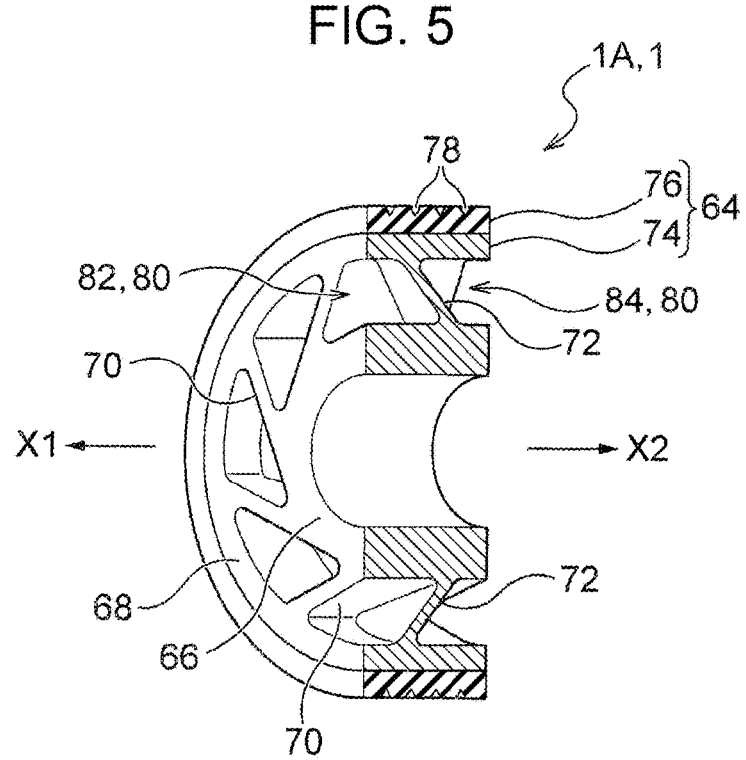
FIG. 5 is a cross-sectional view taken along line V-V in FIG. 4 illustrating the roller according to Embodiment 3 of the invention.
Figure 6:
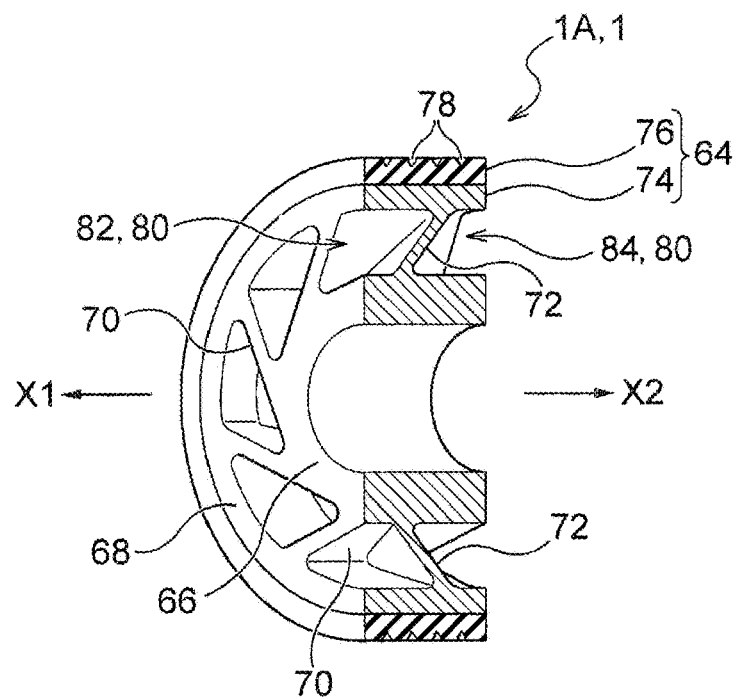
FIG. 6 is a cross-sectional view taken along line VI-VI in FIG. 4 illustrating the roller according to Embodiment 3 of the invention.
Figure 7:
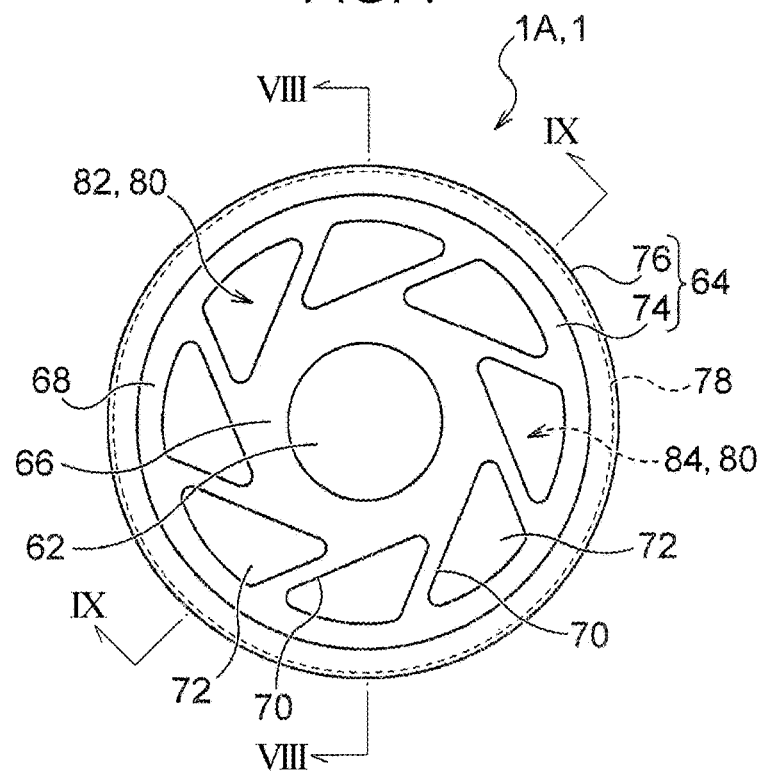
FIG. 7 is a side view illustrating the roller according to Embodiment 3 of the invention.

In the embodiment illustrated in FIG. 4 and FIG. 7, although a structure in which the first connection portion 70 has a linear shape in a side view of the roller 1A and is inclined with respect to the radial direction D from the center of the roller 1A is adopted, the structure is not limited thereto. As will be described below (FIG. 20), a structure in which the first connection portion 70 has a curved shape in a side view of the roller 1A and is inclined with respect to the radial direction D can also be adopted.

On the other hand, the second connection portion 72 is provided in a space portion 80 having a triangular or fan-shaped cross-sectional shape formed between the adjacent first connection portions 70, and is configured with a plate-shaped member having a triangular or a fan-shaped side surface shape is formed in the axial direction X of the roller 1A partitioning the space portion 80 into the X1 side and the other X2 side as described above in substantially middle position in the axial direction.

Accordingly, in the roller 1A according to the present embodiment, due to the presence of the second connection portion 72, the space portion 80 is a non-penetrating space portion 80 that does not penetrate in the axial direction X.

In addition, in the present embodiment, as illustrated in FIGS. 5, 6, 8 and 9, the second connection portion 72 is configured to be inclined with respect to a surface orthogonal to the axial direction X of the roller 1A, and the adjacent second connection portions 72 (FIGS. 8 and 9) via the first connection portion 70 are formed so that the inclination directions are opposite to each other. Therefore, the second connection portions 72 partitioning each space portion 80 arranged at equal intervals in the circumferential direction E are adjacent to each other and the inclination directions thereof are provided so as to be different to each other.

In the embodiments illustrated in FIGS. 5, 6, 8, and 9, although a structure in which the second connection portion 72 has a linear shape in the longitudinal sectional view and is inclined with respect to the surface is adopted, the structure is not limited thereto. As will be described below (FIG. 21), it is also possible to adopt a structure in which the second connection portion 72 has a curved surface in the longitudinal sectional view and is inclined with respect to the surface.

In addition, in the space portion 80, the second connection portion 72 described above is set as a boundary, a recessed portion formed on one side X1 side in the axial direction X2 of the roller 1A is set as a recessed portion 82 on one side, and the recessed portion formed on the other side X side is set as the recessed portion 84 on the other side. These two recessed portions 82 and 84 are provided so as to have a symmetrical structure as illustrated in the drawings.

In addition, as a constituent material of the elastic body portion 64 configured as described above, a non-foamed material is preferable and by adopting the structure including the first connection portion 70 and the second connection portion 72, the reaction force can be reduced to, for example, 1/10 or less, it is possible to secure a crushed amount of the outer peripheral surface of the roller 1A equal to or higher than that of the foamed rubber even if using materials of various rubber hardness.

Figure 11:
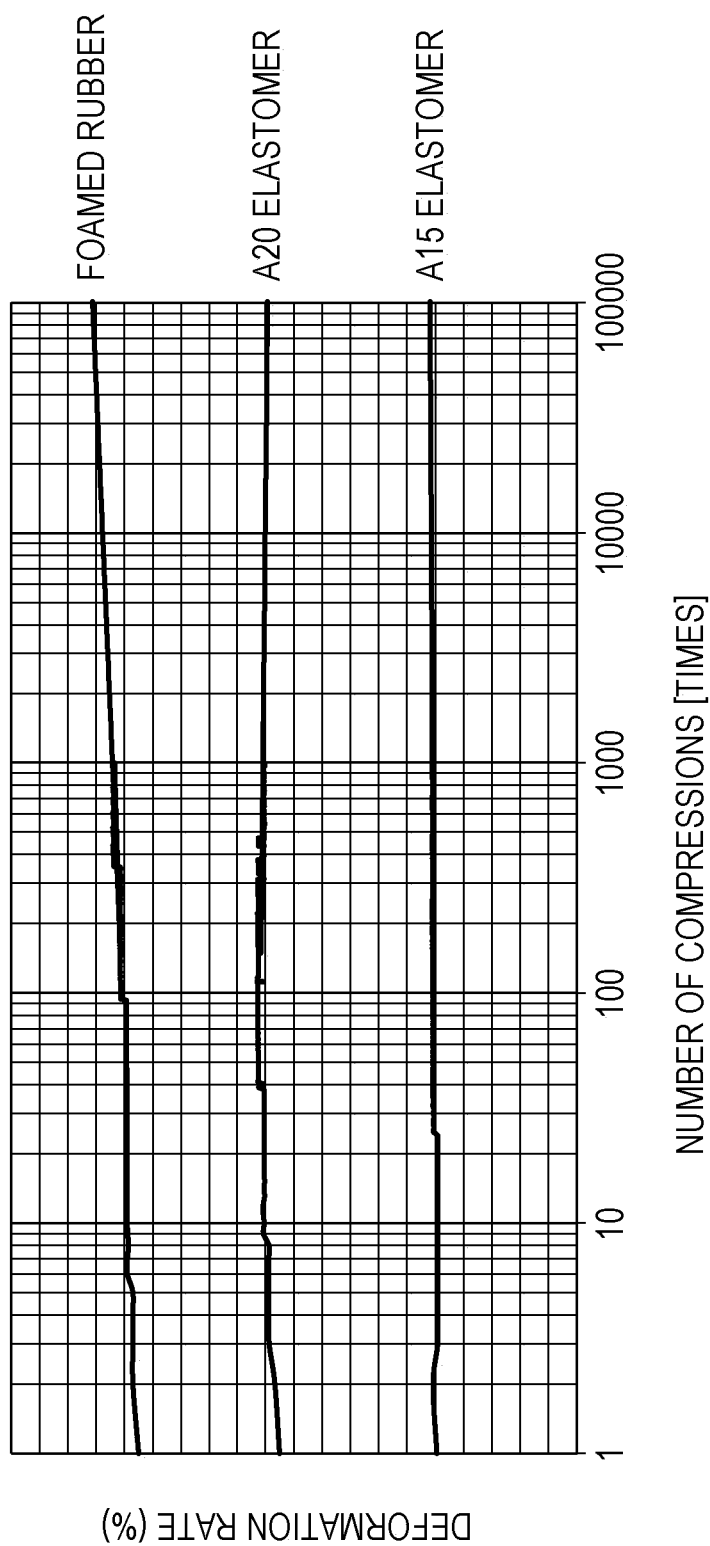
FIG. 11 is a graph illustrating a relationship between the number of compressions and the deformation rate due to the difference in raw materials.

In addition, looking at the relationship between the number of compressions and the deformation rate due to the difference in constituent material of the elastic body portion 64 illustrated in FIG. 11, as the number of compressions of the formed rubber increases, the deformation amount thereof gradually increases and the shape thereof does not recover, and regarding this, in a case of A15 elastomer or A20 elastomer which is a non-foamed material, it is understood that the deformation amount thereof is almost constant and the shape thereof recovers even if the number of compressions thereof increases.

Therefore, from the viewpoint of durability, it can be said that the non-foamed synthetic rubber or elastomer is more preferable as the constituent material of the elastic body portion 64 than the foam material such as foamed rubber.

Figure 12A:
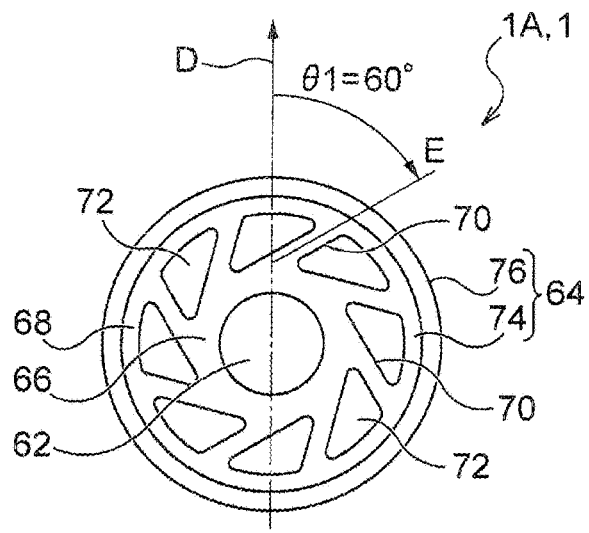
FIG. 12A is a side view illustrating a state where an inclination angle of the first connection portion representing the roller according to Embodiment 3 of the invention is 60°.
Figure 12B:
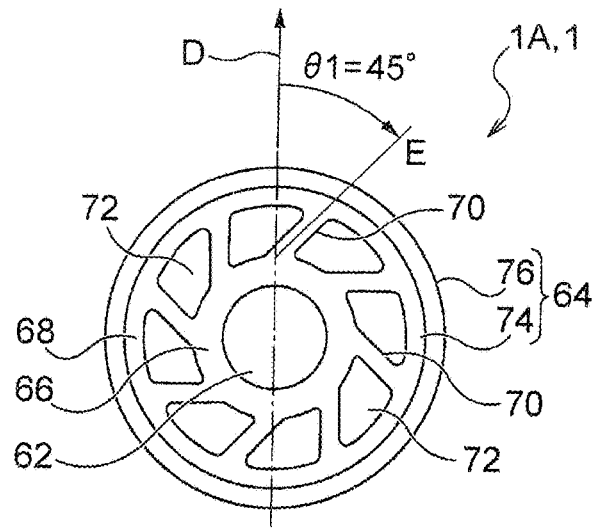
FIG. 12B is a side view illustrating a state where the inclination angle of the first connection portion representing the roller according to Embodiment 3 of the invention is 45°.
Figure 12C:
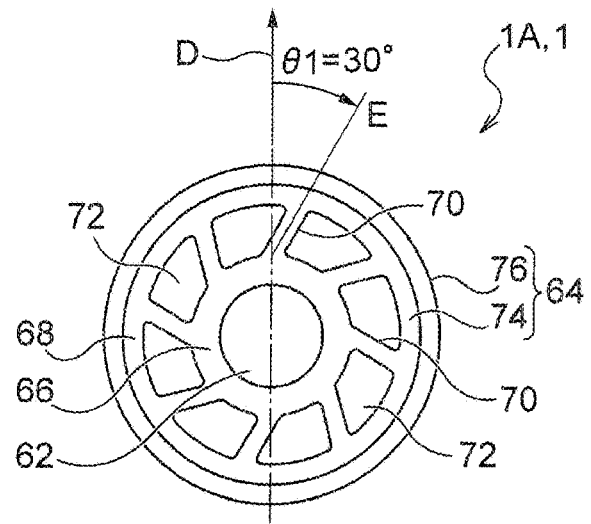
FIG. 12C is a side view illustrating a state where the inclination angle of the first connection portion representing the roller according to Embodiment 3 of the invention is 30°.

In addition, the inclination angle θ1 of the first connection portion 70 is desirably 30° or more with respect to the radial direction D of the roller 1A, and 60° illustrated in FIG. 12A, 45° illustrated in FIG. 12B, 30° illustrated in FIG. 12C or the like can be adopted to the radial direction D of the roller 1A. It can be said that 60° thereof is the most practical inclination angle θ1 of the first connection portion 70 when considering the size of the reaction force and the like.

Figure 13A:
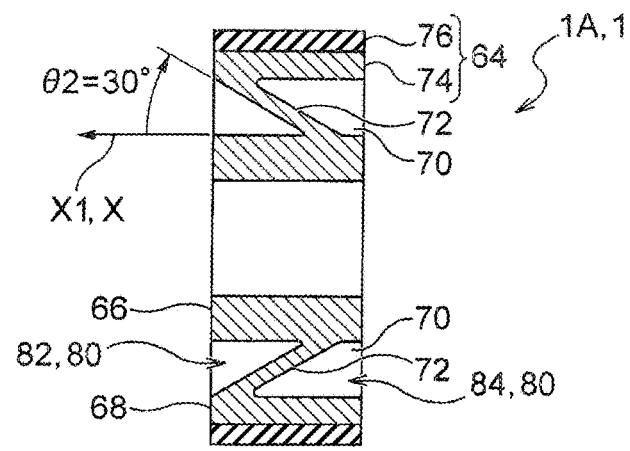
FIG. 13A is a side view illustrating a state where an inclination angle of the second connection portion representing the roller according to Embodiment 3 of the invention is 30°.
Figure 13B:
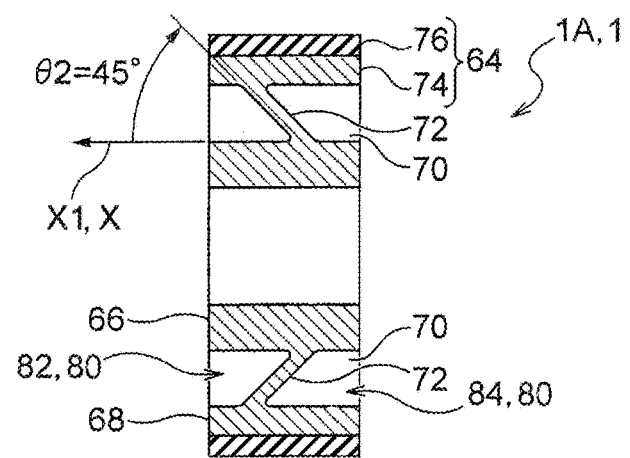
FIG. 13B is a side view illustrating a state where the inclination angle of the second connection portion representing the roller according to Embodiment 3 of the invention is 45°.
Figure 13C:
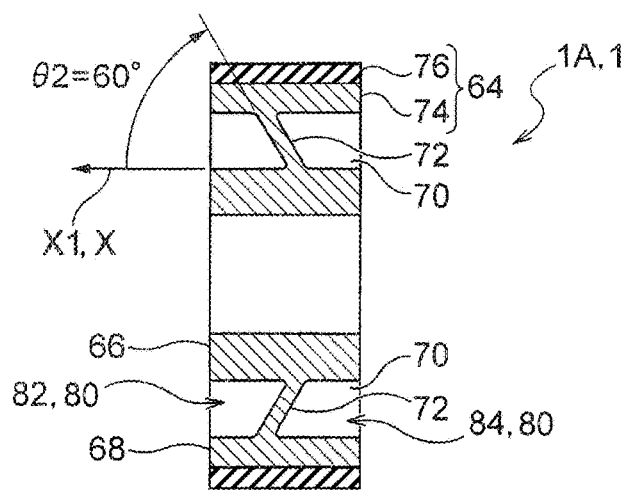
FIG. 13C a side view illustrating a state where the inclination angle of the second connection portion representing the roller according to Embodiment 3 of the invention is 60°.
Figure 14A:
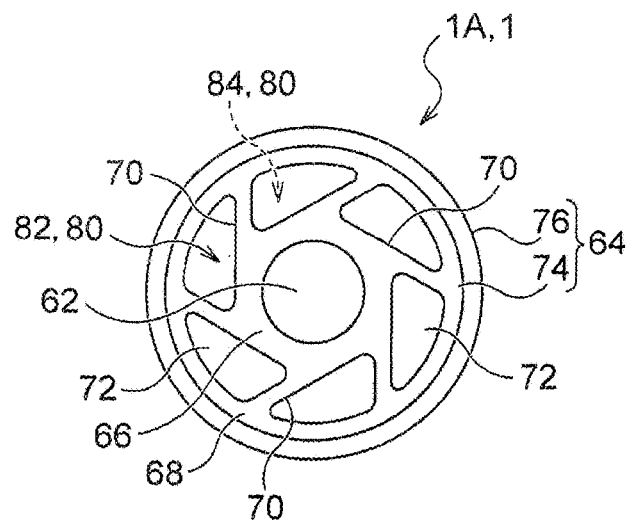
FIG. 14A is a side view illustrating a case where the number of a recessed portion on one side and the number of the recessed portion on the other side illustrating the roller according to Embodiment 3 of the invention is 6.
Figure 14B:
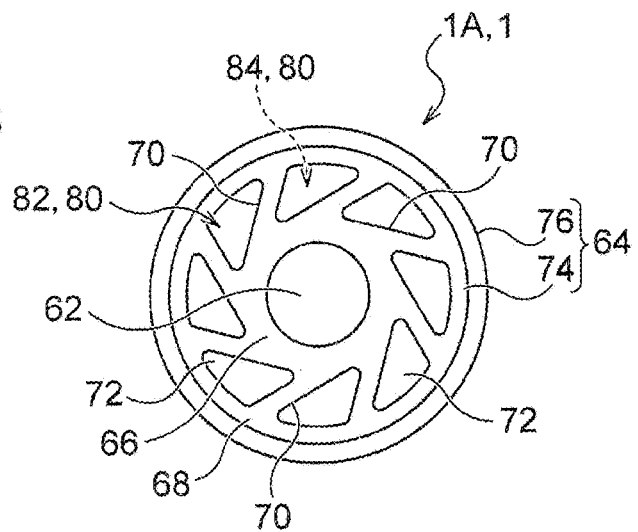
FIG. 14B is a side view illustrating a case where the number of the recessed portion on the one side and the number of the recessed portion on the other side illustrating the roller according to Embodiment 3 of the invention is 8.
Figure 14C:
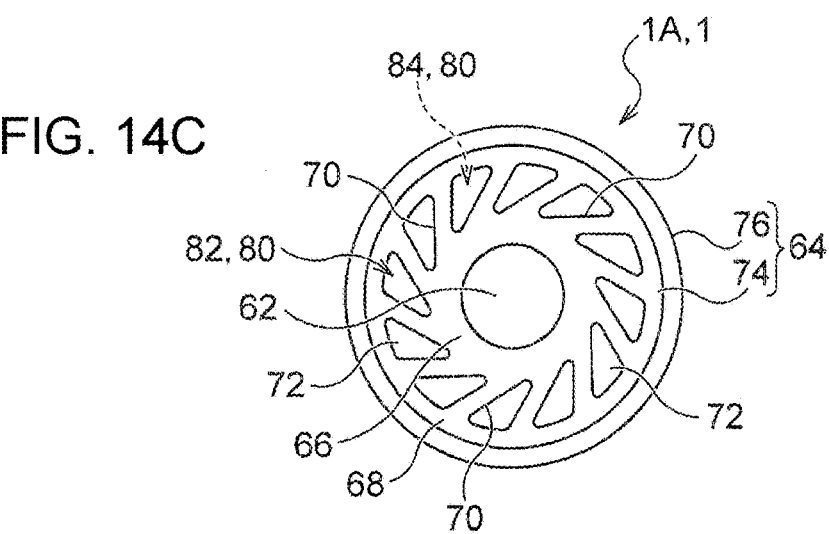
FIG. 14C is a side view illustrating a case where the number of the recessed portion on the one side and the number of the recessed portion on the other side illustrating the roller according to Embodiment 3 of the invention is 12.

In addition, the inclination angle θ2 of the second connection portion 72 is desirably 60° or less with respect to the axial direction X of the roller 1A, and 30° illustrated in FIG. 13A, 45° illustrated in FIG. 13B, 60° illustrated in FIG. 13C or the like can be adopted to the axial direction X of the roller 1A. It can be said that 45° thereof is the most practical inclination angle θ2 of the second connection portion 72 when considering the size of the reaction force and the like.

In addition, it is preferable that each of the number of the recessed portion 82 on the one side formed on one X1 side in the axial direction X of the roller 1A and the number of the recessed portion 84 on the other side formed on the other X2 side with the second connection portion 72 as a boundary is 6 or more. Specifically, 6 pieces illustrated in FIG. 14A, 8 pieces illustrated in FIG. 14B, 12 pieces illustrated in FIG. 14C, and the like are included as practical numbers of the recessed portion 82 on the one side and the recessed portion 84 on the other side. By all means, the number thereof is not limited to these numbers.

Figure 15A:
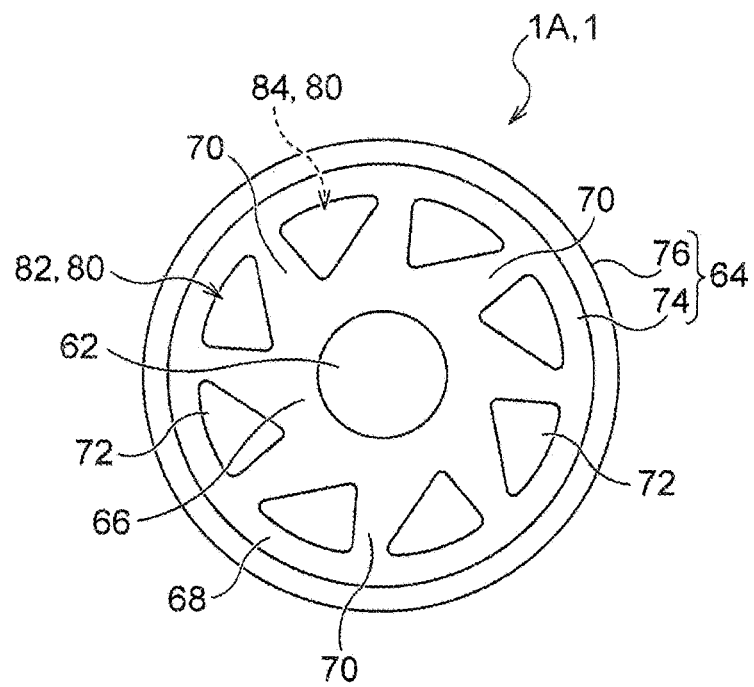
FIG. 15A is a side view illustrating a modification example in which a shape of the first connection portion representing the roller according to Embodiment 3 of the invention is different.

In addition to this, the shape of the first connection portion 70 is formed to have a uniform thickness from the base end side connected to the inner peripheral portion 66 to the leading end side connected to the outer peripheral portion 68 as illustrated in FIGS. 4 to 9 and the like, and alternatively, as illustrated in FIG. 15A, it is also possible to adopt a configuration in which the width of the first connection portion 70 is changed, such as increasing the thickness on the base end side and reducing the thickness on the leading end side.

Figure 15B:
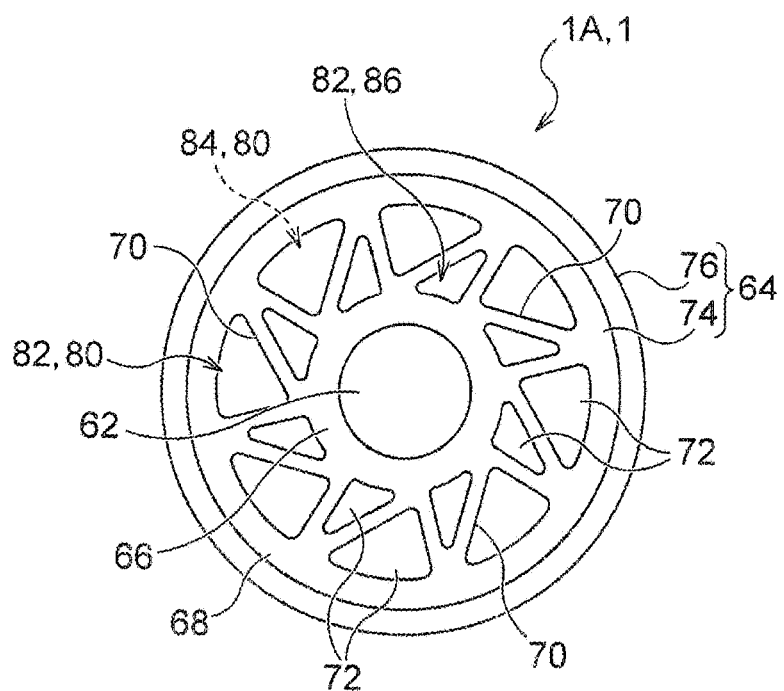
FIG. 15B is a side view illustrating a modification example in which a disposition of a recessed portion on one side and the recessed portion on the other side representing the roller according to Embodiment 3 of the invention is different.

In addition, a second space portion 86 is further formed with respect to the first connection portion 70 illustrated in FIG. 15A, the second connection portion 72 is disposed in the middle portion of the second space portion 86 in the axial direction X, and it is also possible to adopt an embodiment of a structure in which the recessed portion 82 on the one side and the recessed portion 84 on the other side are doubly provided as illustrated in FIG. 15B.

Figure 16A:
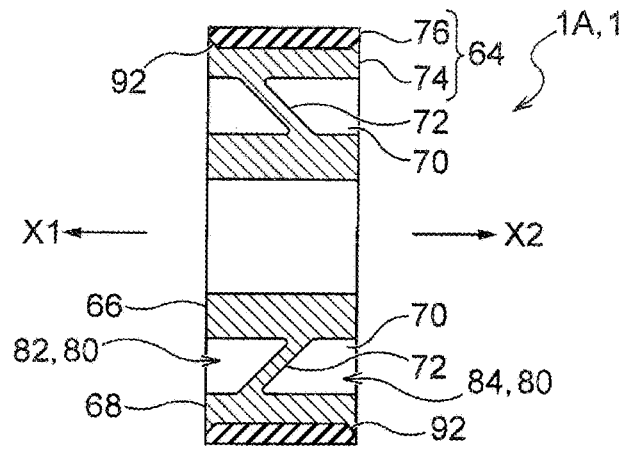
FIG. 16A is a longitudinal sectional view illustrating an example of a junction structure of an inner layer portion and an outer layer portion representing the roller according to Embodiment 3 of the invention.
Figure 16B:
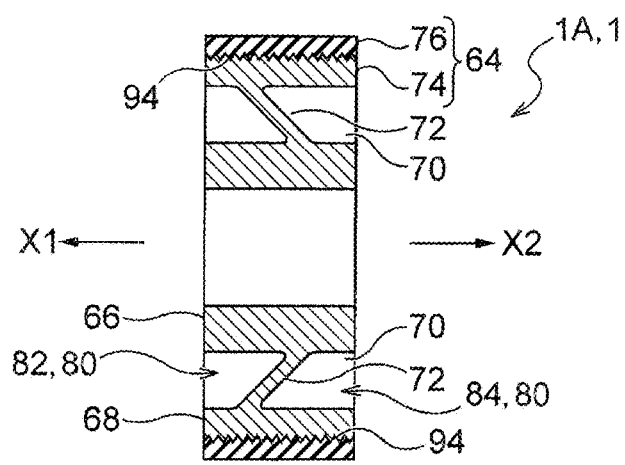
FIG. 16B is a longitudinal sectional view illustrating another example of a junction structure of the inner layer portion and the outer layer portion representing the roller according to Embodiment 3 of the invention.

In addition, as a configuration for improving adhesion between the inner layer portion 74 and the outer layer portion 76, it is possible to adopt various junction structures illustrated in FIGS. 16A to 18. Specifically, as illustrated in FIG. 16A, a chamfer 92 is formed on the edges on the one side X1 side and the other side X2 side of the inner peripheral surface of the outer layer portion 76, or the inner peripheral surface of the outer layer portion 76 is roughened as illustrated in FIG. 16B so that fine irregularities 94 can be formed.

Figure 16C:
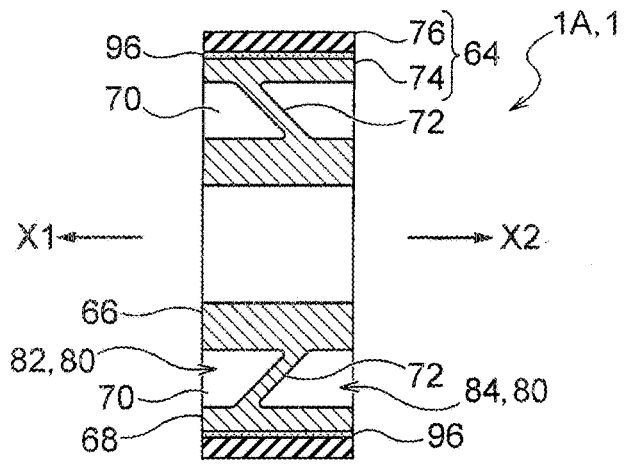
FIG. 16C is a longitudinal sectional view illustrating still another example of a junction structure of the inner layer portion and the outer layer portion representing the roller according to Embodiment 3 of the invention.

In addition, as illustrated in FIG. 16C, primer treatment is applied to the inner peripheral surface of the outer layer portion 76 before the inner layer portion 74 is insert molded, and an adhesive 96 is applied to the surface thereof to adhere the inner layer portion 74 and the outer layer portion 76.

Figure 17A:
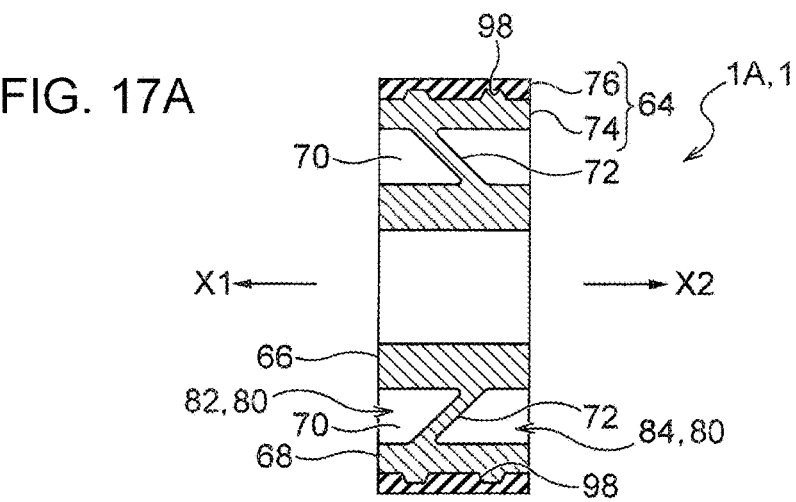
FIG. 17A is a longitudinal sectional view illustrating still another example of a junction structure of the inner layer portion and the outer layer portion representing the roller according to Embodiment 3 of the invention.
Figure 17B:
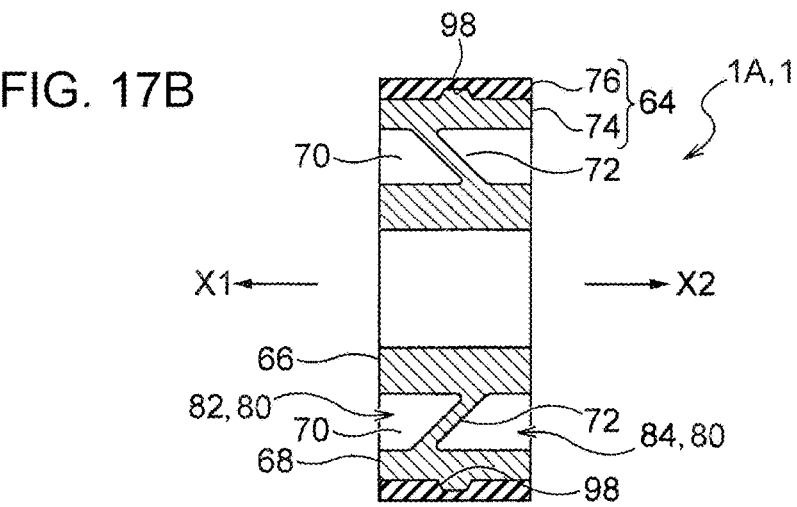
FIG. 17B is a longitudinal sectional view illustrating still another example of a junction structure of the inner layer portion and the outer layer portion representing the roller according to Embodiment 3 of the invention.
Figure 17C:
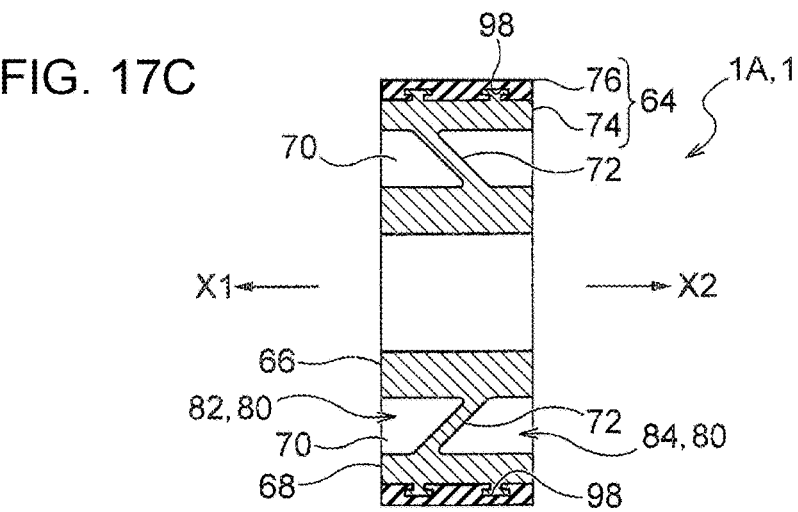
FIG. 17C is a longitudinal sectional view illustrating still another example of a junction structure of the inner layer portion and the outer layer portion representing the roller according to Embodiment 3 of the invention.

In addition, as illustrated in FIGS. 17A, 17B, and 17C, it is possible to form a groove 98 in the inner peripheral surface of the outer layer portion 76 and the cross-sectional shape of the groove 98 may be a trapezoidal shape illustrated in FIGS. 17A and 17B, a triangular shape, a quadrangular shape, or an undercut shape such as a mushroom shape, a dovetail groove shape, or the like having a head portion at the leading end portion as illustrated in FIG. 17C. In addition, as illustrated in FIG. 17, one groove 98 can be provided, and alternatively, as illustrated in FIGS. 17A and 17C, a plurality of grooves 98 can be provided.

Figure 18:
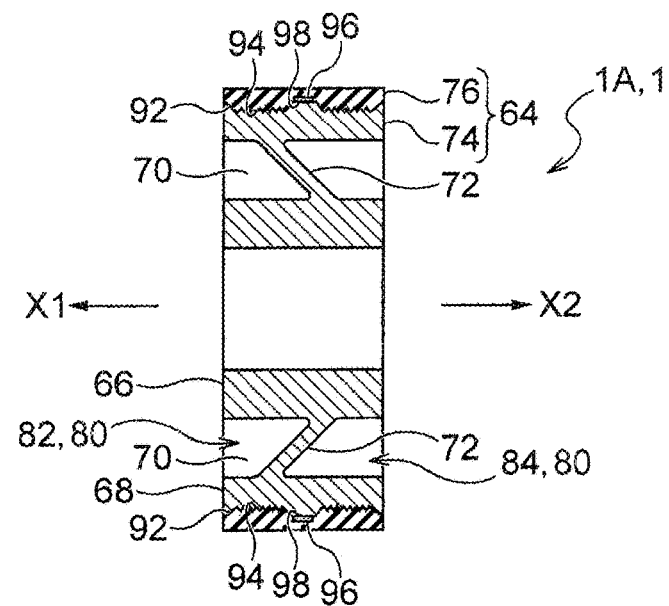
FIG. 18 is a longitudinal sectional view illustrating still another example of a junction structure of the inner layer portion and the outer layer portion representing the roller according to Embodiment 3 of the invention.

Further, as illustrated in FIG. 18, a junction structure of a complex configuration in which the chamfer 92, the fine irregularities 94, the adhesive 96 and the groove 98 described in FIGS. 16A, 16B, 16C and FIGS. 17A, 17B, 17C which are described above can also be adopted.

In addition to this, although not illustrated in the drawings, the first connection portion 70 may have a shape extending linearly in a side view of the roller 1A or alternatively have a shape extending curvedly in a side view thereof. Similarly, the second connection portion 72 may have a shape extending linearly in the longitudinal sectional view, or alternatively, may have a shape extending curvedly in the longitudinal sectional view.

(2) Molding and Action of Roller (Refer to FIGS. 4 to 9, 10, 11 to 18)

Figure 10:
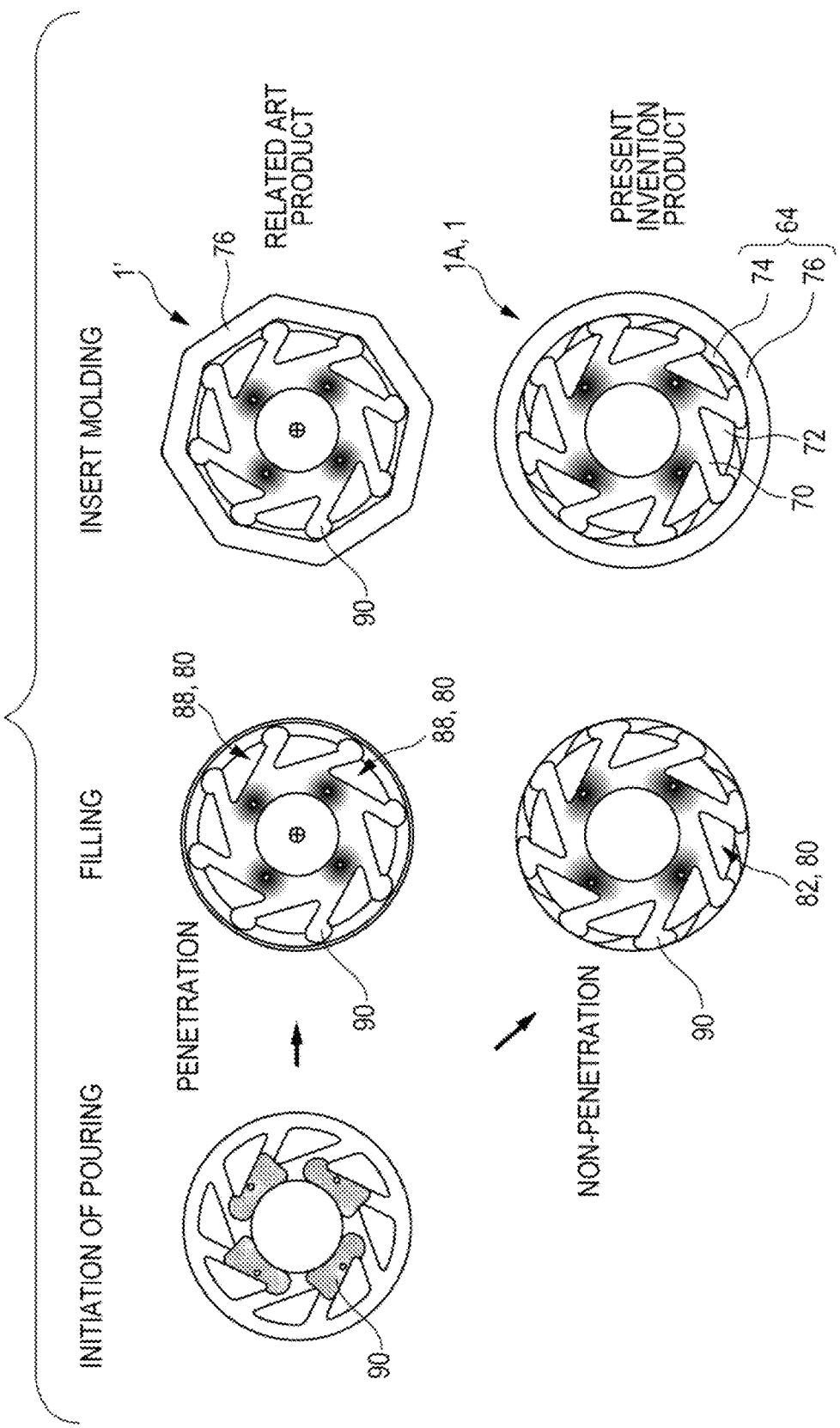
FIG. 10 is an explanation view illustrating a comparison between an aspect of flow of the raw material during the insert molding of the roller according to Embodiment 3 of the invention and an example of the related art having a penetration portion in an axial direction.

In order to mold the roller 1A configured as described above, as an example, insert molding into which the raw material 90 is poured to be filled can be adopted. FIG. 10 illustrates an aspect of a flow of a raw material 90 of the related art product configured with a through hole 88 penetrating the space portion 80 of the roller 1' in the axial direction X and the present invention product configured with a recessed portion 82 on one side and the recessed portion 84 on the other side which does not penetrate the space portion 80 of the roller 1A in the axial direction X is illustrated.

In this case, in the related art product, it is difficult to secure the fluidity of the raw material 90, and the time required until completion of filling is likely to be long. Accordingly, the heat history when the raw material 90 is cured becomes more likely to be changed depending on locations, and when the final molded product is formed, the outer layer portion 76 of the roller 1' is deformed and the shape accuracy of the outer peripheral surface of the roller 1' is likely to decrease.

In contrast, in the present invention product, the fluidity of the raw material 90 is better with the presence of the second connection portion 72, and the present invention product is filled with the raw material 90 up to every corner and the time required for completion of filling is shortened. Accordingly, the change of the thermal history according to locations at the time of curing the raw material 90 is reduced, and even when it becomes the final molded product, large deformation is not generated at the outer layer portion 76 of the roller 1A, and thus the shape accuracy of the outer peripheral surface of the roller 1A increases.

According to the roller 1A of the present embodiment configured as described above, the outer peripheral surface of the roller 1A is structurally easily crushed not by selection of materials, and the area of the contact surface S can be enlarged.

In other words, when a pressing force F directed toward the center of the roller 1A is applied by pressing the roller 1A against the medium P, a force (shearing) which is parallel to the pressing direction and which is the opposite direction acts on both the portions of a connection portion Ji with the inner peripheral portion 66 of the first connection portion 70 and the connection portion Jo with the outer peripheral portion 68 thereof. In this case, since both the first connection portion 70 and the second connection portion 72 are elastic bodies, the first connection portion 70 and the second connection portion 72 swing about the connection portions Ji and Jo of the inner peripheral portion 66 and the outer peripheral portion 68 as a supporting point, and alternatively can also shrink in the longitudinal direction which is the extending direction thereof. By this behavior, a good crush of the outer peripheral surface of the roller 1A described above is realized. Further, by reversing the inclination directions of the adjacent second connection portions 72, the mutual swinging cancels each other, so that shrinkage deformation in the longitudinal direction is generated exclusively and the outer peripheral surface of the roller 1A can be crushed in a well-balanced manner.

Embodiment 4

Figure 19:
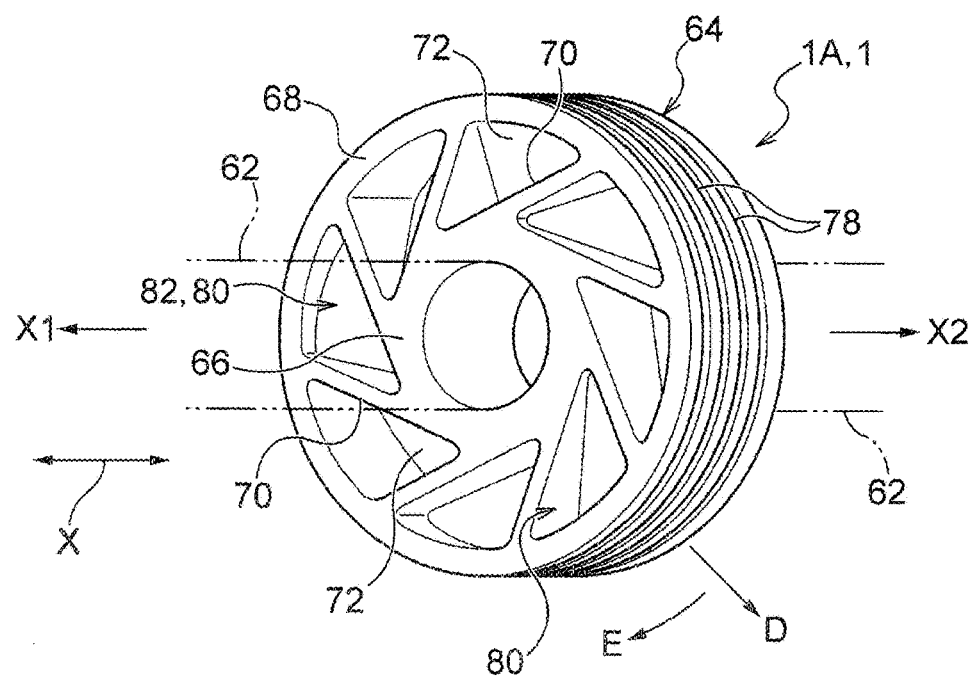
FIG. 19 is a perspective view illustrating a roller according to Embodiment 4 of the invention.

(1) Configuration of Roller (See FIG. 19)

In the roller 1B according to the present embodiment, the roller 1A according to the third embodiment is configured with two members of the inner layer portion 74 and the outer layer portion 76, whereas the outer layer portion 76 of the separate member is eliminated, and the inner layer portion 74 is configured with a single member having the function of the outer layer portion 76.

Therefore, since the other constitution is the same as that of Embodiment 3, here, the same configuration as that of Embodiment 3 will be briefly explained or explanation thereof will be omitted and the unique configuration of the roller 1B according to the present embodiment will be mainly described.

In other words, the roller 1B according to the present embodiment, like the roller 1A according to Embodiment 3, includes a shaft 62 and an elastic body portion 64 and the elastic body portion 64 is configured by including an inner peripheral portion 66, an outer peripheral portion 68, a first connection portion 70, and a second connection portion 72.

The first connection portion 70 is inclined in the same direction in the circumferential direction E with respect to the radial direction D of the roller 1B, and the elastic body portion 64 is configured with a single member.

Accordingly, in the roller 1B according to the present embodiment, a plurality of annular groove portions 78 formed on the outer peripheral surface of the outer layer portion 76 in Embodiment 3 are formed with respect to the outer peripheral surface of the single-member elastic body portion 64.

In addition, as for the modification example in which the constituent material of the elastic body portion 64, the shape, number, angle, and arrangement of the first connection portion 70 and the second connection portion 72 are made different, the ones described in Embodiment 3 can be adopted as it is.

(2) Molding and Action of Roller

In order to mold the roller 1B configured as described above, injection molding, in which the heated and softened raw material 90 is pushed into a closed mold, cooled, solidified, and molded, can be adopted as an example. Also, in this case, the effect illustrated in FIG. 10 described in Embodiment 3 can be obtained, large deformation is not generated on the outer peripheral surface of the roller 1B, and the shape accuracy of the outer peripheral surface of the roller 1B is improved.

Also in the present embodiment, like Embodiment 3, the outer peripheral surface of the roller 1B can be structurally easily crushed in a well-balanced manner not by selection of materials, and the contact area with the medium P can increase.

Other Embodiments

Although the roller 1, the separation device 60, and the image reading apparatus 10 according to the embodiment of the invention are based on the configuration as described above, the partial configuration without departing from the gist of the invention, can naturally change, omit, apply to other devices, or the like.

Figure 20:
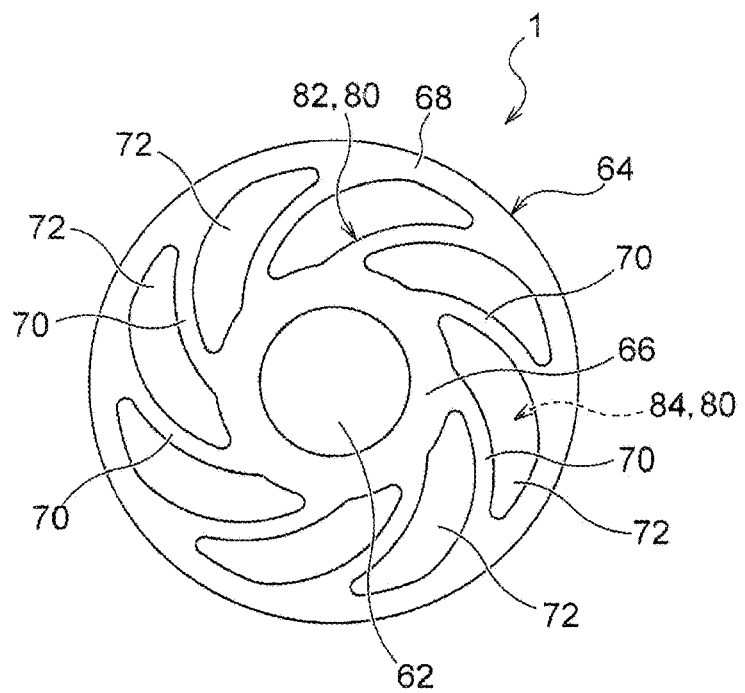
FIG. 20 is a side view illustrating a roller according to another embodiment of the invention.

FIG. 20 is a side view illustrating a roller according to another embodiment of the invention. In the embodiment described above, although the first connection portion 70 has been described as a structure having a linear shape in a side view of the roller 1A and being inclined with respect to the radial direction D from the center of the roller 1A, as illustrated in FIG. 20, a structure in which the first connection portion 70 has a curved shape in a side view and is inclined with respect to the radial direction D of the roller 1 can be adopted. Since the other structure is the same as that of the embodiment described above, description thereof will be omitted.

By making the first connection portion 70 into the curved shape, it is possible to realize the crush of the roller 1 when the pressing force F is applied to the roller 1 in a more well-balanced manner.

Although the structure in which the roller 1 does not have the outer layer portion 76 is illustrated here, it is a matter of course that the roller 1 is not limited to this structure and may have a structure including the outer layer portion 76.

Figure 21:
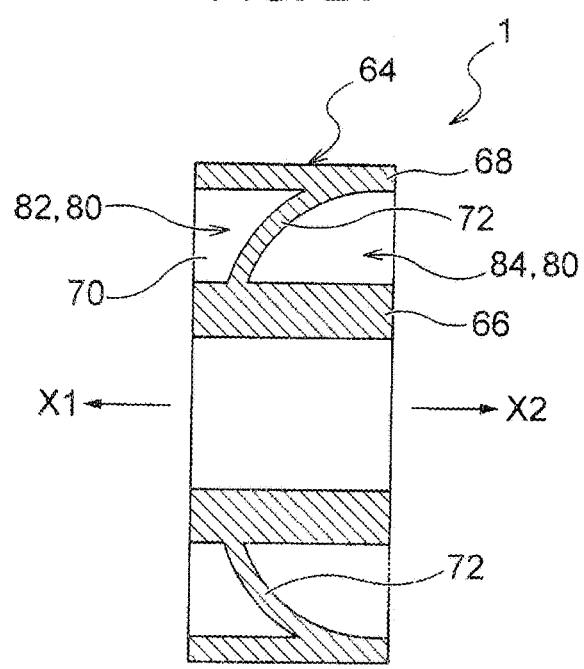
FIG. 21 is a longitudinal sectional view illustrating a roller according to still another embodiment of the invention.

FIG. 21 is a longitudinal sectional view illustrating a roller according to still another embodiment of the invention. Here, although the structure in which the roller 1 does not have the outer layer portion 76 is illustrated, it is a matter of course that the structure is not limited to this structure and a structure having the outer layer portion 76 may also be adopted. In the embodiment described above, although the second connection portion 72 is described as a structure having a linear shape in the longitudinal sectional view and being inclined with respect to the surface, as illustrated in FIG. 21, the second connection portion 72 can also adopt a structure in which the longitudinal sectional view has a curved shape and is inclined with respect to the surface may be adopted. Since the other structure is the same as that of the embodiment described above, description thereof will be omitted.

By making the second connection portion 72 into the curved shape, it is possible to realize the crush of the roller 1 when the pressing force F is applied to the roller 1 in a more well-balanced manner.

Although the structure in which the roller 1 does not have the outer layer portion 76 is illustrated here, it is a matter of course that the roller 1 is not limited to this structure and may have a structure including the outer layer portion 76.

In addition, the roller 1 of the embodiment according to the invention as described above and the separation device 60 applying the roller 1 to the retard roller 36 can be applied to a recording apparatus that executes recording on the medium P. In other words, the recording apparatus according to the embodiment of the invention is an ink jet printer or the like including a recording portion such as a recording head, and a roller that is provided in a medium transport path 26 passing through the recording execution region of the recording portion to apply a feeding force to the medium P, in which the roller has a structure in which the contact surface S is elastically crushed when pressed against the medium P and at least one of the rollers, for example, the retard roller 36 can be configured with the roller 1 of the embodiment according to the invention.

In addition, the thickness of the inner peripheral portion 66 and the outer peripheral portion 68 can also be appropriately adjusted within a range where necessary rigidity and elasticity can be obtained. In addition to this, in the shapes of the side view of the first connection portion 70 and the longitudinal sectional view of the second connection portion 72, various shapes of which the pressing direction described above is parallel and an opposite force (shearing) can be obtained, and, in addition to the shape described in the embodiment described above, it may be a shape bent in one stage or in multi-stages or a branched shape in the middle thereof.

The entire disclosure of Japanese Patent Application No. 2017-079505, filed Apr. 13, 2017, and 2017-079506, filed Apr. 13, 2017 are expressly incorporated by reference herein.

What is claimed is:

1. A roller comprising:
    a shaft; and
    an elastic body portion that is provided on an outer peripheral surface of the shaft,
    wherein the elastic body portion includes:
        an inner peripheral portion which comprises a side that is adjacent to the shaft,
        an outer peripheral portion which comprises an outer side with respect to the inner peripheral portion,
        a plurality of first connection portions which connect the inner peripheral portion and the outer peripheral portion, and
        a plurality of second connection portions which are provided in a space portion between the adjacent first connection portions to each other and which partition the space portion into one side and the other side of the roller in a shaft mounting direction, and
    wherein the first connection portion is inclined in a circumferential direction with respect to a radial direction of the roller,
    wherein the second connection portion is inclined with respect to a surface orthogonal to the shaft mounting direction of the roller, and
    wherein inclination directions of adjacent second connection portions are opposite to each other.

2. The roller according to claim 1,
    wherein a recessed portion on one side that can be formed on one side of the roller in the shaft mounting direction and the recessed portion on the other side that can be formed on the other side with the second connection portion as a boundary are formed so as to be symmetrical with respect to a center surface orthogonal to the shaft mounting direction.

3. A separation device comprising:
    a feeding roller; and
    a retard roller that forms a pair with the feeding roller, separates media other than a medium to be transported from a bundle of media, and returns the media to an upstream side,
    wherein the retard roller is the roller according to claim 2.

4. The roller according to claim 1,
    wherein the constituent material of the elastic body portion is a non-foamed material.

5. A separation device comprising:
    a feeding roller; and
    a retard roller that forms a pair with the feeding roller, separates media other than a medium to be transported from a bundle of media, and returns the media to an upstream side thereof,
    wherein the retard roller is the roller according to claim 4.

6. The roller according to claim 1,
    wherein the elastic body portion includes:
        an inner layer portion that comprises the side that is adjacent to the shaft, and an outer layer portion that comprises a side which is in contact with the medium, and wherein the inner layer portion includes the first connection portion, the second connection portion, the inner peripheral portion, and the outer peripheral portion.

7. A separation device comprising:

a feeding roller; and a retard roller that forms a pair with the feeding roller, separates media other than a medium to be transported from a bundle of media, and returns the media to an upstream side thereof, wherein the retard roller is the roller according to claim 6.

8. The roller according to claim 1, wherein an inclination angle of the first connection portion which connects the inner peripheral portion and the outer peripheral portion to each other is 30° or more with respect to the radial direction of the roller.

9. A separation device comprising:

a feeding roller; and a retard roller that forms a pair with the feeding roller, separates media other than a medium to be transported from a bundle of media, and returns the media to an upstream side thereof, wherein the retard roller is the roller according to claim 8.

10. The roller according to claim 1, wherein an inclination angle of the second connection portion is 60° or less with respect to the axial direction of the roller.

11. A separation device comprising:

a feeding roller; and a retard roller that forms a pair with the feeding roller, separates media other than a medium to be transported from a bundle of media, and returns the media to an upstream side thereof, wherein the retard roller is the roller according to claim 10.

12. The roller according to claim 1, wherein the numbers of the recessed portion on the one side that can be formed on one side in the axial direction of the roller and the recessed portion on the other side that can be formed on the other side with the second connection portion as a boundary are 6 or more, respectively.

13. A separation device comprising:

a feeding roller; and a retard roller that forms a pair with the feeding roller, separates media other than a medium to be transported from a bundle of media, and returns the media to an upstream side thereof, wherein the retard roller is the roller according to claim 12.

14. A separation device comprising:

a feeding roller; and a retard roller that forms a pair with the feeding roller, separates media other than a medium to be transported from a bundle of media, and returns the media to an upstream side, wherein the retard roller is the roller according to claim 1.

15. The separation device according to claim 14, wherein an inclination direction of the first connection portion is formed such that, when the roller receives a pressing force from the medium, a swinging direction with the connection portion with the inner peripheral portion of the first connection portion as a supporting point becomes a direction of returning the medium to the upstream side.

16. An image reading apparatus comprising:

a reading portion that reads image information of a medium; and a roller that is provided in a medium transport path which passes through a reading execution region of the reading portion and that applies a feeding force to the medium, wherein the roller has a structure in which a contact surface between the roller and the medium is elastically crushed when the roller is pressed against the medium, and wherein at least one of the rollers is the roller according to claim 1.

17. A recording apparatus comprising:

a recording portion; and a roller that is provided in a medium transport path passing through a recording execution region of the recording portion and applies a feeding force to the medium, wherein the roller has a structure in which a contact surface thereof is elastically crushed when pressed against the medium, and wherein at least one of the rollers is the roller according to claim 1.

* * * * *